(12) United States Patent
Takahashi et al.

(10) Patent No.: US 11,434,977 B2
(45) Date of Patent: Sep. 6, 2022

(54) VEHICLE DRIVE DEVICE

(71) Applicants: AISIN CORPORATION, Kariya (JP); TOYOTA JIDOSHA KABUSHIKI KAISHA, Toyota (JP)

(72) Inventors: Katsutoshi Takahashi, Nisio (JP); Yoshihiko Sasaki, Okazaki (JP); Hiroki Nemoto, Anjo (JP); Tatsuya Kawamura, Nagoya (JP); Kazunori Kaneko, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 882 days.

(21) Appl. No.: 16/323,350

(22) PCT Filed: Jul. 27, 2017

(86) PCT No.: PCT/JP2017/027214
§ 371 (c)(1),
(2) Date: Feb. 5, 2019

(87) PCT Pub. No.: WO2018/061443
PCT Pub. Date: Apr. 5, 2018

(65) Prior Publication Data
US 2020/0271194 A1    Aug. 27, 2020

(30) Foreign Application Priority Data
Sep. 30, 2016   (JP) .............................. JP2016-194571

(51) Int. Cl.
*F16H 57/04*   (2010.01)
*F16H 1/06*    (2006.01)
(Continued)

(52) U.S. Cl.
CPC .............. *F16H 1/06* (2013.01); *F16H 48/38* (2013.01); *F16H 57/037* (2013.01);
(Continued)

(58) Field of Classification Search
CPC .......... F16H 1/06; F16H 48/38; F16H 57/037; F16H 57/0423; F16H 2057/02034;
(Continued)

(56) References Cited

U.S. PATENT DOCUMENTS 6,969,333 B2 *  11/2005  Sayama ................... B60K 6/48
                                                      475/5
8,602,935 B2 * 12/2013  Katoh ...................... B60K 1/00
                                                      184/6.12
(Continued)

FOREIGN PATENT DOCUMENTS

JP       S59-208268 A      11/1984
JP       2006-307908 A     11/2006
(Continued)

OTHER PUBLICATIONS

Sep. 5, 2017 International Search Report issued in International Patent Application No. PCT/JP2017/027214.

*Primary Examiner* — Sherry L Estremsky
(74) *Attorney, Agent, or Firm* — Oliff PLC

(57) ABSTRACT

A vehicle drive device that includes a rotary electric machine, a power transfer mechanism that transfers a rotational drive force between the rotary electric machine and a plurality of wheels, a case that houses at least a part of the power transfer mechanism and the rotary electric machine, and a hydraulic pump.

22 Claims, 6 Drawing Sheets

(51) Int. Cl.
  *F16H 48/38* (2012.01)
  *F16H 57/037* (2012.01)
  *H02K 7/116* (2006.01)
  *H02K 9/19* (2006.01)

(52) U.S. Cl.
  CPC ......... *F16H 57/0423* (2013.01); *H02K 7/116* (2013.01); *H02K 9/19* (2013.01)

(58) Field of Classification Search
  CPC ........ F16H 57/045; H02K 7/116; H02K 9/19; B60K 2001/001
  See application file for complete search history.

(56) References Cited

U.S. PATENT DOCUMENTS

| | | | |
|---|---|---|---|
| 9,022,174 B2 | 5/2015 | Takagi et al. | |
| 10,378,641 B2 * | 8/2019 | Nakano | F16H 48/40 |
| 10,465,574 B2 * | 11/2019 | Kiyokami | F16H 57/0441 |
| 10,746,282 B2 * | 8/2020 | Ito | F16H 57/0435 |
| 2004/0134294 A1 | 7/2004 | Hirabayashi et al. | |
| 2008/0182712 A1 * | 7/2008 | Kira | B60L 3/0061 477/7 |
| 2013/0145879 A1 * | 6/2013 | Nakamura | F16H 57/042 74/467 |
| 2014/0155214 A1 | 6/2014 | Kimura et al. | |
| 2018/0180162 A1 * | 6/2018 | Hakuta | B60K 17/165 |
| 2019/0181720 A1 * | 6/2019 | Yamaguchi | F16N 31/00 |

FOREIGN PATENT DOCUMENTS

| | | |
|---|---|---|
| JP | 2007-321927 A | 12/2007 |
| JP | 2010-028980 A | 2/2010 |
| JP | 2013-119918 A | 6/2013 |
| JP | 2013-167296 A | 8/2013 |
| JP | 2014-111958 A | 6/2014 |
| JP | 2014-190528 A | 10/2014 |
| WO | 13/011562 A1 | 1/2013 |

* cited by examiner

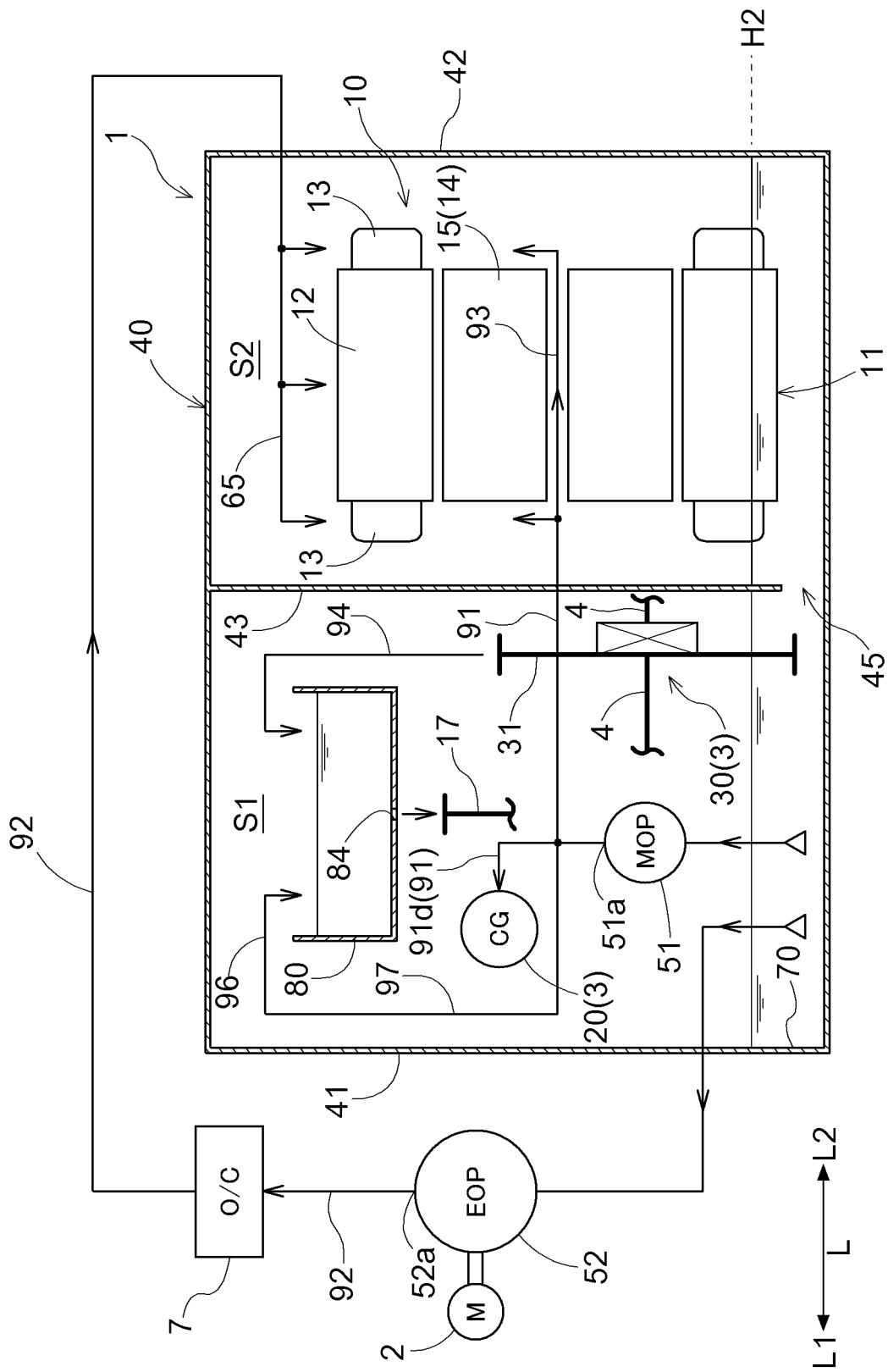

VEHICLE DRIVE DEVICE

BACKGROUND

The present disclosure relates to a vehicle drive device.

A vehicle drive device that includes a rotary electric machine as a drive force source for wheels includes a power transfer mechanism that transfers a rotational drive force between the rotary electric machine and the wheels. Japanese Patent Application Publication No. 2013-119918 (JP 2013-119918 A) describes an example of such a power transfer mechanism, which is specifically a power transfer device (2) that transfers a rotational drive force between an electric motor (4) and left and right wheels. In the power transfer device (2) described in JP 2013-119918 A, a first oil accumulation portion (50) is formed at the bottom portion of a gear housing (8), and a final gear (24) is disposed such that a part of the final gear (24) is immersed in oil in the first oil accumulation portion (50). The final gear (24) constitutes a differential gear mechanism that distributes torque input from an electric motor (4) side to the left and right wheels. The power transfer device (2) described in JP 2013-119918 A is configured such that oil in the first oil accumulation portion (50) splashed by the final gear (24) which rotates along with travel of the vehicle is supplied to portions to be lubricated.

In a configuration in which oil stored in a reservoir portion is splashed by a gear that constitutes a differential gear mechanism, such as the configuration described in JP 2013-119918 A, the stirring loss of oil in a state in which the vehicle is traveling (vehicle travel state) is increased as the level of an oil surface in the reservoir portion becomes higher. In the case where there is a rotary member (such as a rotor of a rotary electric machine, for example), at least a part of which is immersed in oil, other than the differential gear mechanism, the stirring loss (or sheering loss) of oil due to rotation of such a rotary member also tends to be increased. Thus, it is conceivable to lower the level of the oil surface in the reservoir portion by decreasing the total amount of oil inside the vehicle drive device, in order to reduce the stirring loss of oil. Since lubrication of the differential gear mechanism tends to be insufficient in accordance with lowering of the oil surface level in the reservoir portion when the vehicle starts to travel (in particular, when the vehicle starts to travel after being stationary for a long period), however, the above technique may accordingly increase the possibility that lubrication of the differential gear mechanism becomes insufficient, even if the stirring loss of oil may be reduced. However, J P 2013-119918 A does not describe such a possibility.

SUMMARY

An exemplary aspect of the disclosure provides a vehicle drive device that can reduce the stirring loss of oil in a vehicle travel state while suppressing the possibility that lubrication of a differential gear mechanism becomes insufficient when the vehicle starts to travel to be low.

In view of the foregoing, the present disclosure provides a vehicle drive device including a rotary electric machine, a power transfer mechanism that transfers a rotational drive force between the rotary electric machine and a plurality of wheels, a case that houses at least a part of the power transfer mechanism and the rotary electric machine, and a hydraulic pump, the power transfer mechanism including a differential gear mechanism that distributes torque input from a rotary electric machine side to the plurality of wheels. The vehicle drive device has a first characteristic configuration, in which: the case is provided with a first reservoir that stores oil suctioned by the hydraulic pump inside the case, and a second reservoir that stores oil inside the case; the hydraulic pump is a pump driven always in conjunction with rotation of the differential gear mechanism; a delivery port of the hydraulic pump communicates with a supply through which oil is supplied to the second reservoir; at least a part of the differential gear mechanism is housed in the first reservoir; and a first height is a height of an oil surface in the first reservoir in a state in which rotation of the plurality of wheels is stopped, and the first height is such a height that at least a part of the differential gear mechanism is immersed in oil stored in the first reservoir.

According to the first characteristic configuration described above, the first height is the height of an oil surface in the first reservoir in a state (vehicle stationary state) in which the vehicle is stationary, and the first height is such a height that at least a part of the differential gear mechanism is immersed in oil stored in the first reservoir. Hence, at least a part of the differential gear mechanism can be in the state of being immersed in oil when the differential gear mechanism starts rotation along with start of travel of the vehicle. Accordingly, it is possible to suppress the possibility that lubrication of the differential gear mechanism becomes insufficient when the vehicle starts to travel to be low.

According to the first characteristic configuration described above, further, the vehicle drive device includes the hydraulic pump which suctions oil stored in the first reservoir, and the hydraulic pump is driven always in conjunction with rotation of the differential gear mechanism. The delivery port of the hydraulic pump communicates with the supply, through which oil is supplied to the second reservoir which is provided separately from the first reservoir. Hence, in a state (vehicle travel state) in which the vehicle is traveling, the hydraulic pump is driven to suction oil stored in the first reservoir, and the oil surface in the first reservoir can be made lower than the first height by a height corresponding to the amount of oil stored in the second reservoir or more because the oil which has been suctioned from the first reservoir is supplied to the second reservoir. That is, the oil surface in the first reservoir can be lowered positively in the vehicle travel state. Accordingly, it is possible to suppress the stirring loss of oil due to rotation of a rotary member such as the differential gear mechanism during travel of the vehicle to be low.

As described above, according to the first characteristic configuration described above, it is possible to reduce the stirring loss of oil in a vehicle travel state while suppressing the possibility that lubrication of a differential gear mechanism becomes insufficient when the vehicle starts to travel to be low.

In view of the foregoing, the present disclosure provides a vehicle drive device including a rotary electric machine, a power transfer mechanism that transfers a rotational drive force between the rotary electric machine and a plurality of wheels, a case that houses at least a part of the power transfer mechanism and the rotary electric machine, and a hydraulic pump, the power transfer mechanism including a differential gear mechanism that distributes torque input from a rotary electric machine side to the plurality of wheels. The vehicle drive device has a second characteristic configuration, in which: the case is provided with a first reservoir that stores oil suctioned by the hydraulic pump inside the case, and a second reservoir that stores oil inside the case; at least a part of the differential gear mechanism is disposed at a height between an uppermost part and a lowermost part of a rotor of the rotary electric machine; a delivery port of the hydraulic pump communicates with a supply through which oil is supplied to the second reservoir; at least a part of the rotary electric machine is housed in the first reservoir; a first height is a height of an oil surface in the first reservoir in a state in which rotation of the plurality of wheels is stopped, and the first height is such a height that at least a part of a rotor core of the rotor is immersed in oil stored in the first reservoir; and a second height is a height of an oil surface in the first reservoir in a state in which the plurality of wheels are rotating as a second height, and the second height is a height below a lowermost part of the rotor core.

According to the second characteristic configuration described above, the second height is a height below the lowermost part of the rotor core. Hence, the stirring loss of oil due to rotation of the rotor core can be reduced by avoiding the rotor core being immersed in oil stored in the first reservoir in the vehicle travel state. In the vehicle travel state, in addition, the height of the oil surface in the first reservoir can be lowered from the first height to the second height, and therefore the stirring loss of oil due to rotation of another rotary member that rotates during travel of the vehicle, as with the differential gear mechanism, can also be reduced. The delivery port of the hydraulic pump which suctions oil stored in the first reservoir communicates with the supply through which oil is supplied to the second reservoir which is provided separately from the first reservoir, and therefore the oil surface in the first reservoir can be lowered positively only if the hydraulic pump is operating in the vehicle travel state.

According to the second characteristic configuration described above, further, the first height is such a height that at least a part of the rotor core is immersed in oil stored in the first reservoir. That is, as described above, the height (first height) of the oil surface in the first reservoir in the vehicle stationary state can be made so high that at least a part of the rotor core is immersed in oil while the height (second height) of the oil surface in the first reservoir in the vehicle travel state is lowered in order to reduce the stirring loss of oil. As a result of being able to make the first height so high, it is easy to immerse at least a part of the differential gear mechanism, at least a part of which is disposed at a height between the uppermost part and the lowermost part of the rotor, in oil stored in the first reservoir. Consequently, it is possible to suppress the possibility that lubrication of the differential gear mechanism becomes insufficient when the vehicle starts to travel to be low.

As described above, also according to the second characteristic configuration described above, in addition to the first characteristic configuration described above, it is possible to reduce the stirring loss of oil in a vehicle travel state while suppressing the possibility that lubrication of a differential gear mechanism becomes insufficient when the vehicle starts to travel to be low.

BRIEF DESCRIPTION OF THE DRAWINGS

FIG. 6 is a simplified diagram of a hydraulic circuit according to the embodiment.

DETAILED DESCRIPTION OF EMBODIMENTS

Figure 1:
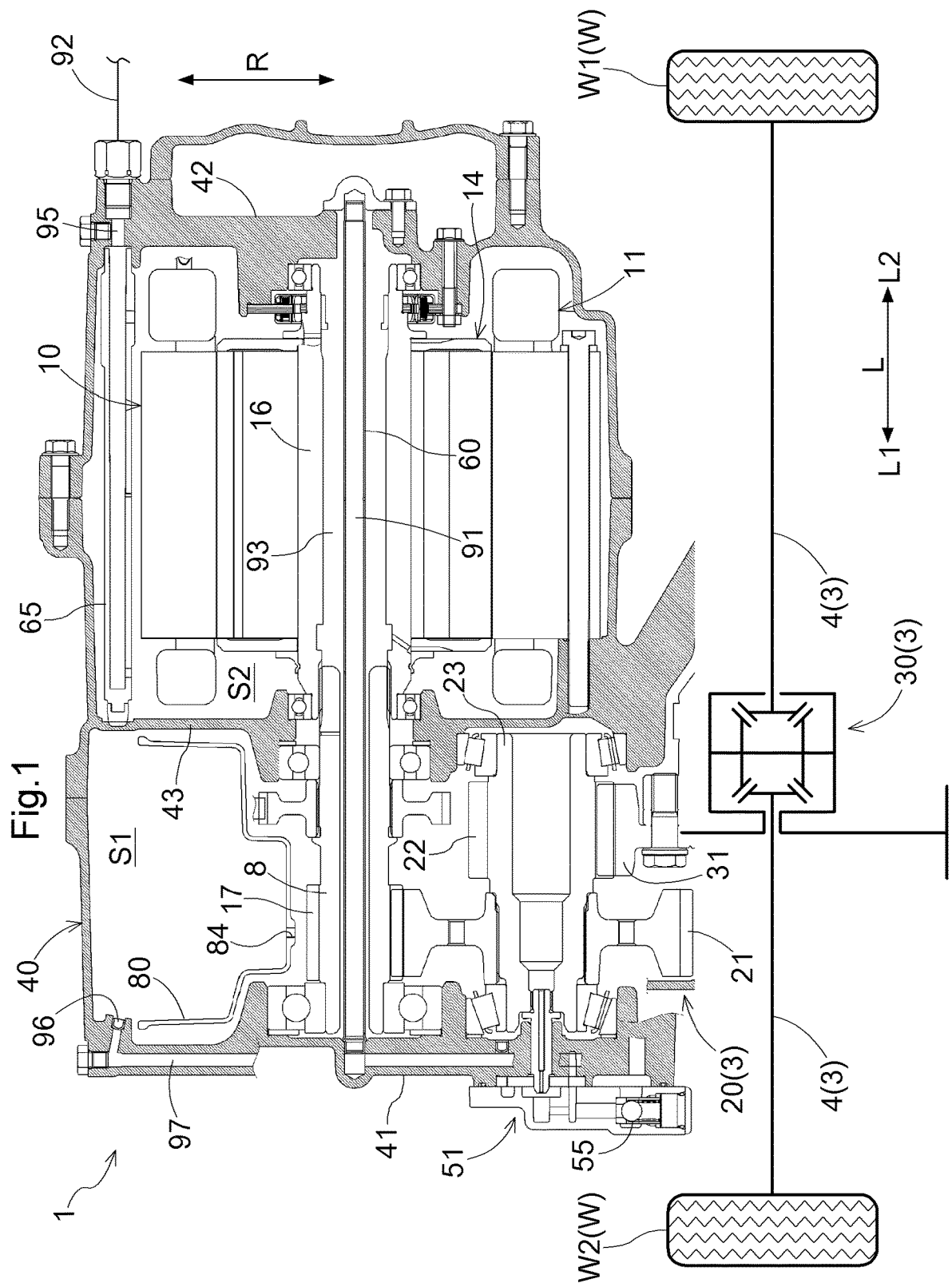
FIG. 1 is a diagram illustrating a schematic configuration of a vehicle drive device according to an embodiment.

A vehicle drive device according to an embodiment will be described with reference to the drawings. In the embodiment described below, a first rotary electric machine 10 corresponds to the "rotary electric machine", an insertion hole 46 corresponds to the "communication hole", and a third wall portion 43 corresponds to the "separation wall".

Herein, the term "rotary electric machine" refers to any of a motor (electric motor), a generator (electric generator), and a motor generator that functions both as a motor and as a generator as necessary. With regard to the arrangement of two members, the phrase "overlap each other as seen in a certain direction" as used herein means that when an imaginary line that is parallel to the viewing direction is moved in directions that are orthogonal to the imaginary line, the imaginary line crosses both of the two members in at least some region. The phrase "extend in a certain direction" as used herein for the shape of a member is not limited to extension of the member in a direction parallel to a reference direction defined by the certain direction, and also includes extension of the member in a direction intersecting the reference direction and even extension of the member in a direction intersecting the reference direction at an intersection angle within a predetermined range (e.g. less than 45 degrees).

In the following description, unless stated specifically, the "axial direction L" is defined with reference to a rotational axis A (see FIGS. 4 and 5) of a differential gear mechanism 30. The rotational axis A is a virtual axis, and a differential input gear 31 and a differential case 33 of the differential gear mechanism 30 rotate about the rotational axis A. One side in the axial direction L is defined as a "first axial side L1", and the other side in the axial direction L (opposite side from the first axial side L1) is defined as a "second axial side L2". In the following description, unless stated specifically, the "radial direction R" is defined with reference to a rotational axis (virtual axis) of the first rotary electric machine 10. A rotor 14 of the first rotary electric machine 10 rotates about the rotational axis. In the following description, directions for each member indicate directions with that member assembled to a vehicle drive device 1. The terms "upper" and "lower" are defined with reference to a vertical direction (up-down direction Z in FIGS. 4 and 5) with the vehicle drive device 1 mounted on the vehicle. Terms related to the direction, the position, etc. of each member may allow a difference due to a manufacturing error.

As illustrated in FIG. 1, the vehicle drive device 1 includes the first rotary electric machine 10, and a power transfer mechanism 3 that transfers a rotational drive force between the first rotary electric machine 10 and a plurality of wheels W (in the present embodiment, two, left and right, wheels W). The plurality of wheels W include a first wheel W1. In the present embodiment, the plurality of wheels W include the first wheel W1 and a second wheel W2. The vehicle (vehicle on which the vehicle drive device 1 is mounted) travels using torque of the first rotary electric machine 10 which is transferred to the wheels W via the power transfer mechanism 3. The power transfer mechanism 3 includes the differential gear mechanism 30 which distributes torque input from the first rotary electric machine 10 side to the plurality of wheels W. In the present embodiment, the power transfer mechanism 3 includes a counter gear mechanism 20 that transfers a rotational drive force between the first rotary electric machine 10 and the differential gear mechanism 30, and torque of the first rotary electric machine 10 is input to the differential gear mechanism 30 via the counter gear mechanism 20. The vehicle drive device 1 according to the present embodiment serves as a drive device that drives the wheels W (rear wheels) on the rear side of the vehicle. The vehicle drive device 1 according to the present embodiment is disposed under the floor of the vehicle, for example.

The first rotary electric machine 10 is electrically connected to an electricity accumulation device (not illustrated) provided on the vehicle, and is supplied with electric power from the electricity accumulation device to generate power. In this event, the power generated by the first rotary electric machine 10 is transferred to the wheels W via the power transfer mechanism 3. When the first rotary electric machine 10 applies a braking force due to regeneration to the wheels W, meanwhile, the electric power generated by the first rotary electric machine 10 is supplied to the electricity accumulation device. A second rotary electric machine 2 (see FIG. 6) to be discussed later is also supplied with electric power from an electricity accumulation device (not illustrated) provided on the vehicle to generate power.

Figure 4:
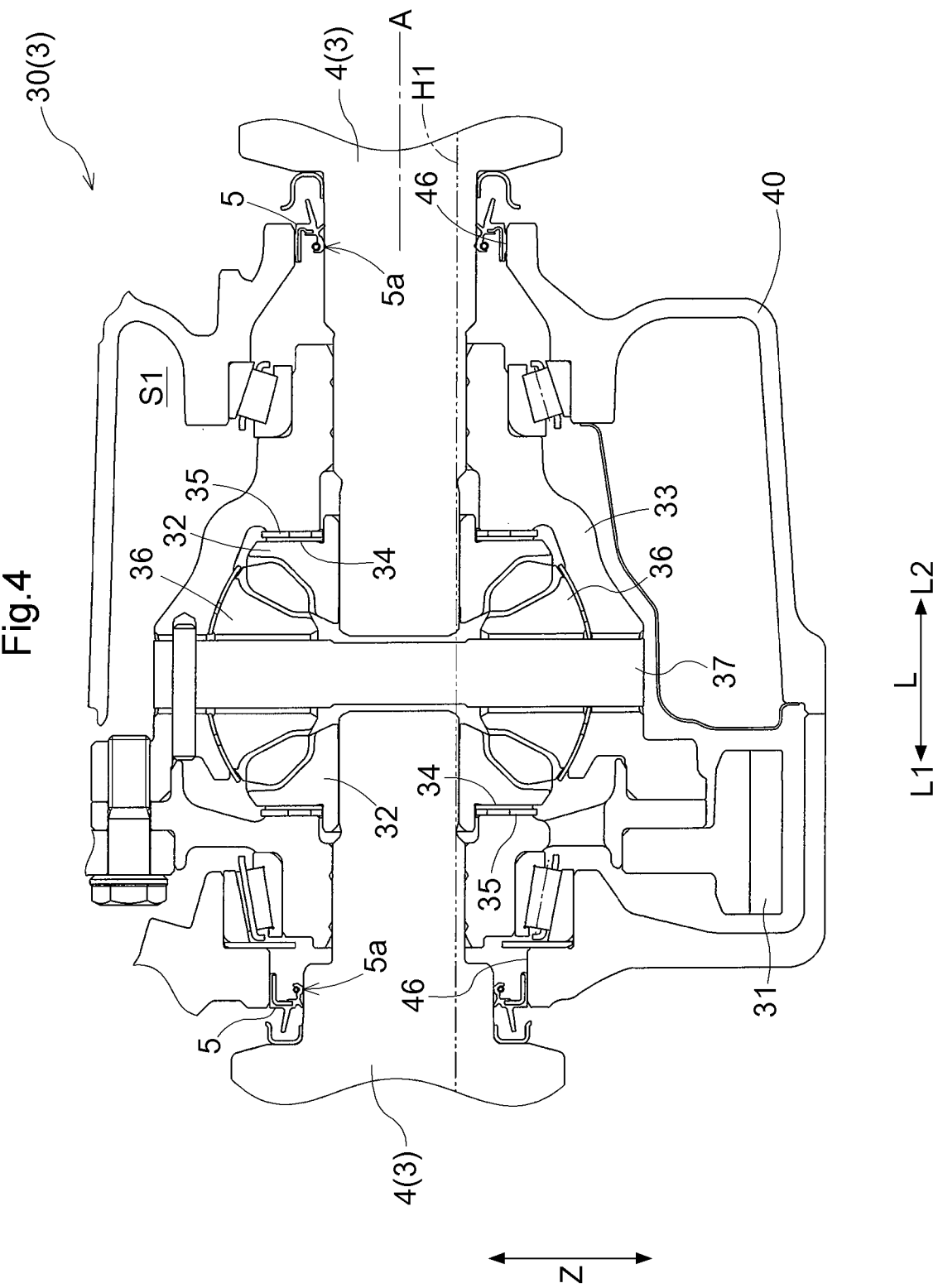
FIG. 4 is a sectional view of a differential gear mechanism according to the embodiment.

The vehicle drive device 1 includes a case 40 that houses the first rotary electric machine 10. The case 40 also houses at least a part of the power transfer mechanism 3. In the present embodiment, a most part of the power transfer mechanism 3 is housed inside the case 40. As illustrated in FIG. 4, however, a part of an output shaft 4 of the power transfer mechanism 3 is disposed outside the case 40. As illustrated in FIGS. 1 and 4, a first space S1 that houses the differential gear mechanism 30 and a second space S2 that houses the first rotary electric machine 10 are formed inside the case 40. In the present embodiment, the first space S1 also houses the counter gear mechanism 20.

Figure 2:
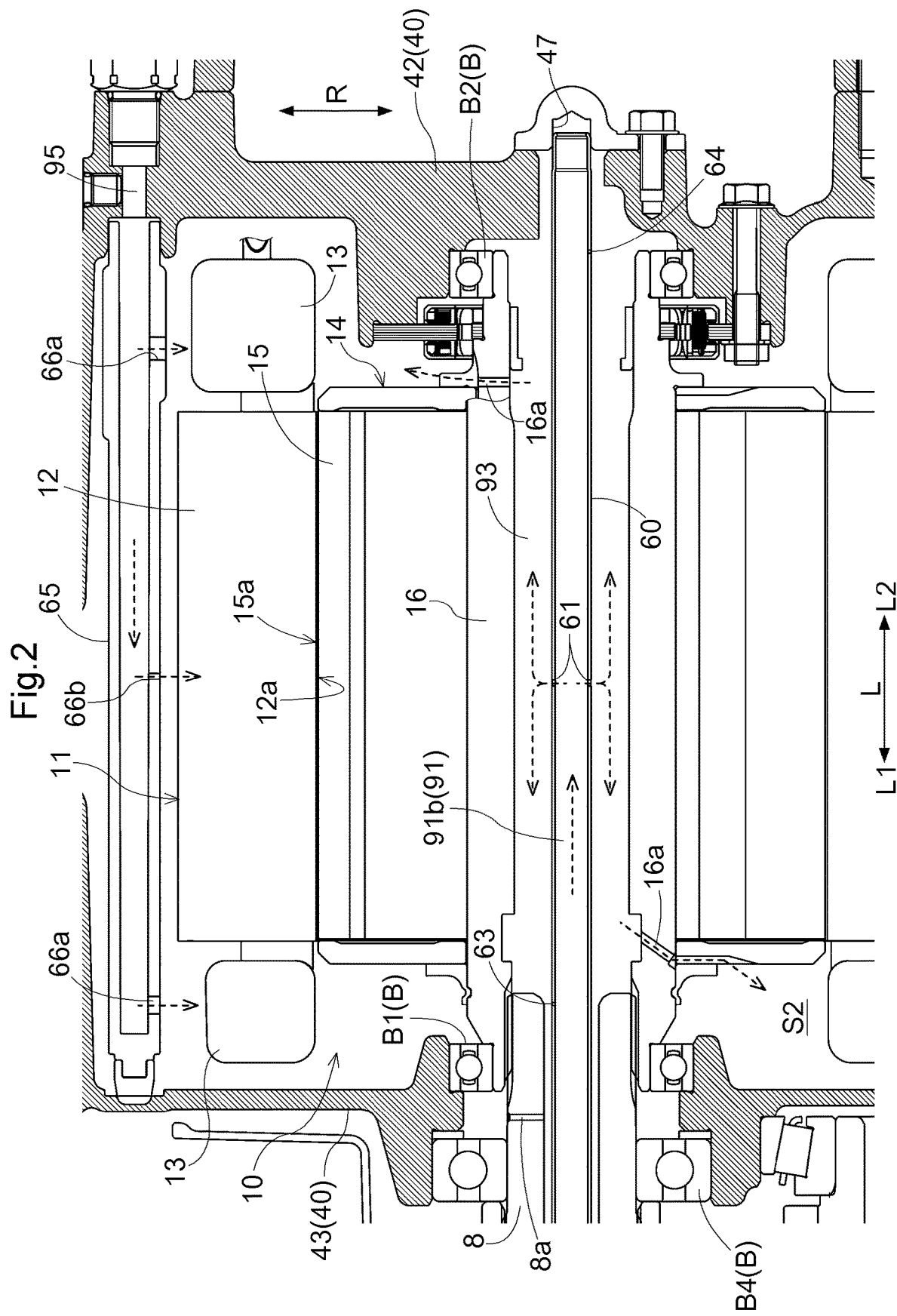
FIG. 2 is a partial enlarged view of FIG. 1.

In the present embodiment, the first rotary electric machine 10 is disposed on an axis that is parallel to and separate from the rotational axis A (see FIGS. 4 and 5) of the differential gear mechanism 30. Hence, in the present embodiment, the axial direction (hereinafter referred to as a "rotary electric machine axial direction") of the first rotary electric machine 10 coincides with the axial direction L. As illustrated in FIG. 2, the first rotary electric machine 10 includes the rotor 14 and a stator 11. The stator 11 includes a stator core 12 fixed to the case 40. In the present embodiment, the first rotary electric machine 10 is a rotary electric machine of a rotating field type, and a coil is wound around the stator core 12. Coil end portions 13 which are portions of the coil that project in the rotary electric machine axial direction (in the present embodiment, the axial direction L) from the stator core 12 are formed on both sides in the rotary electric machine axial direction with respect to the stator core 12.

The rotor 14 is supported by the case 40 so as to be rotatable with respect to the stator 11. As illustrated in FIG. 2, the rotor 14 includes a rotor core 15 disposed on the inner side in the radial direction R with respect to the stator core 12 so as to overlap the stator core 12 as seen in the radial direction R. That is, in the present embodiment, the first rotary electric machine 10 is a rotary electric machine of an inner rotor type. In this manner, the first rotary electric machine 10 includes the rotor core 15 and the stator core 12 which is disposed on the outer side in the radial direction R with respect to the rotor core 15. The stator core 12 has a cylindrical inner peripheral surface 12a that faces an outer peripheral surface 15a of the rotor core 15 in the radial direction R. The outer peripheral surface 15a of the rotor core 15 is formed in a cylindrical shape that extends in the rotary electric machine axial direction (in the present embodiment, the axial direction L). In the present embodiment, the inner peripheral surface 12a of the stator core 12 is formed by respective end surfaces, on the inner side in the radial direction R, of a plurality of teeth formed on the stator core 12.

As illustrated in FIG. 2, the rotor core 15 is fixed to the outer peripheral surface of a rotor shaft 16 supported so as to be rotatable with respect to the case 40. That is, the rotor 14 includes the rotor shaft 16 which is supported so as to be rotatable with respect to the case 40, and the rotor core 15 which is fixed to the outer peripheral surface of the rotor shaft 16. The inner peripheral surface of the rotor core 15 contacts the rotor shaft 16 so as to enable heat transmission. In the present embodiment, the first rotary electric machine 10 is an interior permanent magnet rotary electric machine (e.g. a synchronous motor), and permanent magnets are embedded in the rotor core 15.

Figure 3:
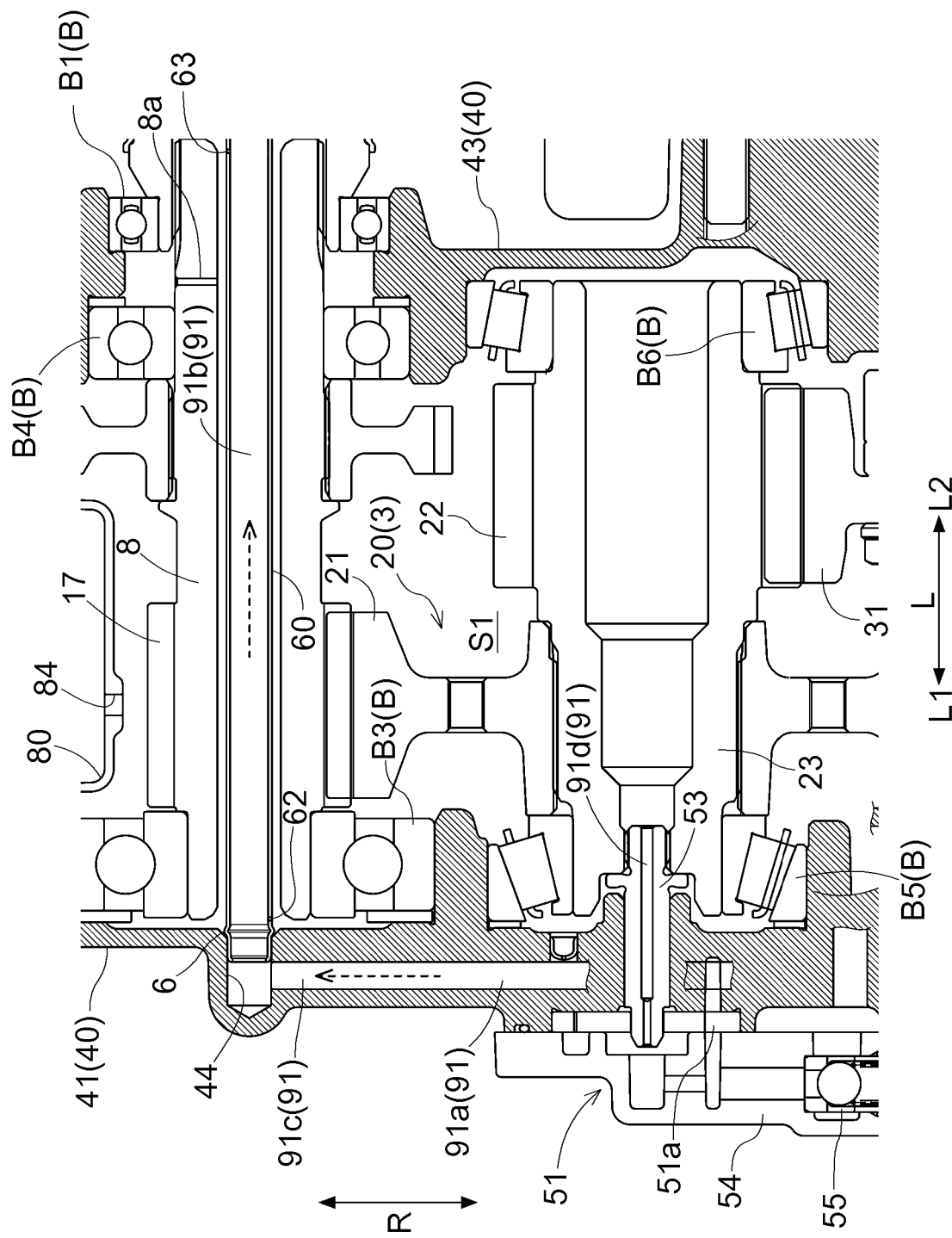
FIG. 3 is another partial enlarged view of FIG. 1.

As illustrated in FIGS. 1 to 3, the case 40 includes a first wall portion 41 disposed on one side (in the present embodiment, the first axial side L1) in the rotary electric machine axial direction with respect to the rotor core 15, and a second wall portion 42 disposed on the other side (in the present embodiment, the second axial side L2) in the rotary electric machine axial direction with respect to the rotor core 15. In the present embodiment, the case 40 further includes a third wall portion 43 disposed between the first wall portion 41 and the rotor core 15 in the rotary electric machine axial direction (in the present embodiment, the axial direction L). The first space S1 discussed above is formed between the first wall portion 41 and the third wall portion 43 in the rotary electric machine axial direction, and the second space S2 discussed above is formed between the second wall portion 42 and the third wall portion 43 in the rotary electric machine axial direction. Hence, the first space S1 and the second space S2 are separated from each other in the rotary electric machine axial direction by the third wall portion 43.

The rotor shaft 16 is supported by the second wall portion 42 and the third wall portion 43 so as to be rotatable with respect to the case 40. Specifically, as illustrated in FIG. 2, a first bearing B1 that supports the rotor shaft 16 so as to be rotatable with respect to the third wall portion 43 is disposed on the first axial side L1 with respect to the rotor core 15, and a second bearing B2 that supports the rotor shaft 16 so as to be rotatable with respect to the second wall portion 42 is disposed on the second axial side L2 with respect to the rotor core 15.

The rotor shaft 16 is coupled to an output gear 17 that outputs torque of the first rotary electric machine 10. In the present embodiment, as illustrated in FIGS. 1 and 3, the output gear 17 which is coupled to the rotor shaft 16 of the first rotary electric machine 10 is disposed between the first wall portion 41 and the third wall portion 43 in the rotary electric machine axial direction (in the present embodiment, the axial direction L). In the present embodiment, the output gear 17 is disposed on the first axial side L1 with respect to the rotor shaft 16 so as to be coaxial with the rotor shaft 16 and rotatable together with the rotor shaft 16. The output gear 17 is supported by the first wall portion 41 and the third wall portion 43 so as to be rotatable with respect to the case 40. Specifically, as illustrated in FIG. 3, a third bearing B3 that supports an intermediate shaft 8, on which the output gear 17 is formed, so as to be rotatable with respect to the first wall portion 41 is disposed on the first axial side L1 with respect to the output gear 17, and a fourth bearing B4 that supports the intermediate shaft 8 so as to be rotatable with respect to the third wall portion 43 is disposed on the second axial side L2 with respect to the output gear 17. As illustrated in FIG. 2, an end portion of the intermediate shaft 8 on the second axial side L2 is coupled to an end portion of the rotor shaft 16 on the first axial side L1 through spline engagement. Consequently, the rotor shaft 16 is coupled so as to rotate together with the output gear 17.

As illustrated in FIGS. 1 and 3, the counter gear mechanism 20 includes a first gear 21 meshed with the output gear 17 of the first rotary electric machine 10, a second gear 22 meshed with the differential input gear 31 of the differential gear mechanism 30, and a coupling shaft 23 that couples the first gear 21 and the second gear 22 to each other. The counter gear mechanism 20 is disposed between the first wall portion 41 and the third wall portion 43 in the rotary electric machine axial direction (in the present embodiment, the axial direction L), and the coupling shaft 23 is supported by the first wall portion 41 and the third wall portion 43 so as to be rotatable with respect to the case 40. Specifically, as illustrated in FIG. 3, a fifth bearing B5 that supports the coupling shaft 23 so as to be rotatable with respect to the first wall portion 41 is disposed on the first axial side L1 with respect to the first gear 21 and the second gear 22, and a sixth bearing B6 that supports the coupling shaft 23 so as to be rotatable with respect to the third wall portion 43 is disposed on the second axial side L2 with respect to the first gear 21 and the second gear 22.

As illustrated in FIG. 4, the differential gear mechanism 30 includes the differential input gear 31, differential output gears 32 (side gears), and the differential case 33 which houses the differential output gears 32 and which rotates together with the differential input gear 31. Herein, the rotational axis of the differential input gear 31 and the differential case 33 which rotate together with each other is defined as the rotational axis A of the differential gear mechanism 30. In the present embodiment, at least a part of the differential gear mechanism 30 is disposed at a height between the uppermost portion and the lowermost portion of the rotor 14 of the first rotary electric machine 10. That is, the respective regions of arrangement of the differential gear mechanism 30 and the rotor 14 overlap each other in the up-down direction Z. Specifically, in the present embodiment, as is clear from the positional relationship between the outer peripheral surface 15a of the rotor core 15 and the rotational axis A of the differential gear mechanism 30 in the up-down direction Z illustrated in FIG. 5, the rotational axis A of the differential gear mechanism 30 is disposed at a height between the uppermost portion and the lowermost portion of the rotor core 15 of the first rotary electric machine 10. The outer peripheral surface 15a of the rotor core 15 is disposed slightly on the inner side in the radial direction R with respect to the inner peripheral surface 12a of the stator core 12. For simplification, however, the outer peripheral surface 15a and the inner peripheral surface 12a are indicated by an identical line in FIG. 5.

The differential input gear 31 is a gear meshed with a gear that is used to input torque of the first rotary electric machine 10 to the differential gear mechanism 30. In the present embodiment, the differential input gear 31 is meshed with the second gear 22 of the counter gear mechanism 20. As illustrated in FIG. 4, a pinion shaft 37 that rotates together with the differential case 33 and a plurality of pinion gears 36 supported by the pinion shaft 37 so as to be rotatable are disposed inside the differential case 33. A pair of differential output gears 32 are disposed separately on both sides in the axial direction L with respect to the pinion shaft 37, and disposed such that the pair of differential output gears 32 are each meshed with the respective pinion gears 36.

As illustrated in FIGS. 1 and 4, the pair of differential output gears 32 are coupled to the respective wheels W by the output shafts 4 (drive shafts). That is, the power transfer mechanism 3 includes the output shafts 4 which couple the differential gear mechanism 30 and the wheels W to each other. When one of the two, left and right, wheels W is defined as the first wheel W1 and the other of the two, left and right, wheels W is defined as the second wheel W2, the power transfer mechanism 3 includes the output shaft 4 which couples the differential gear mechanism 30 (specifically, one of the pair of differential output gears 32) and the first wheel W1 to each other, and the output shaft 4 which couples the differential gear mechanism 30 (specifically, the other of the pair of differential output gears 32) and the second wheel W2 to each other. The differential output gears 32 are coupled so as to rotate together with the respective output shafts 4 (e.g. through spline engagement). When torque is input to the differential input gear 31, the pair of differential output gears 32 (pair of output shafts 4) are rotationally driven with the plurality of pinion gears 36 revolving as the differential case 33 rotates. In this event, when there occurs a difference in rotational resistance between the first wheel W1 and the second wheel W2 when the vehicle travels along a curved road or the like, the pair of differential output gears 32 rotate at different speeds from each other with the plurality of pinion gears 36 rotating.

As illustrated in FIG. 4, each output shaft 4 is supported so as to be rotatable with respect to the case 40 in the state of being inserted into the insertion hole 46 which communicates between the inside and the outside of the case 40. A seal member 5 that has a contact surface 5a that contacts the outer peripheral surface of the output shaft 4 in a slidable state is disposed on the inner peripheral surface of the insertion hole 46. The seal member 5 is provided to prevent oil inside the case 40 to leak out of the case 40 through the insertion hole 46. In the present embodiment, the seal member 5 includes an annular fixed portion to be press-fitted with the inner peripheral surface of the insertion hole 46, and an annular seal portion that contacts the outer peripheral surface of the output shaft 4 in the state of being supported by the fixed portion, and the contact surface 5a is formed by the inner peripheral surface of the seal portion. In the case where a member (tubular member) that rotates together with the output shaft 4 is disposed on the outer side in the radial direction (radial direction with reference to the rotational axis A) with respect to the output shaft 4 at a portion of the output shaft 4 disposed at the same position in the axial direction L as the insertion hole 46, the contact surface 5a of the seal member 5 may be configured to contact the outer peripheral surface of such a member that rotates together with the output shaft 4 in a slidable state.

As illustrated in FIG. 4, the differential gear mechanism 30 includes washers (34 and 35) disposed between the differential case 33 and the differential output gears 32 in the axial direction of the output shafts 4. The output shafts 4 are disposed coaxially with the rotational axis A, and therefore the axial direction of the output shafts 4 coincides with the axial direction L. The washers (34 and 35) are disposed on an end surface of each differential output gears 32 on the opposite side from the pinion shaft 37 in the axial direction L. In the present embodiment, the differential gear mechanism 30 includes two washers (34 and 35), that is, a conical washer 34 and a side washer 35, between one of the pair of differential output gears 32 and the differential case 33, and two washers (34 and 35), that is, a conical washer 34 and a side washer 35, between the other of the pair of differential output gears 32 and the differential case 33. The side washer 35 is a thrust washer formed in an annular plate shape, and is used to reduce the frictional resistance between the differential output gear 32 and the differential case 33. Meanwhile, the conical washer 34 is a disc spring, and is used to bias the differential output gear 32 toward the pinion gear 36 using an elastic restoration force.

Figure 5:
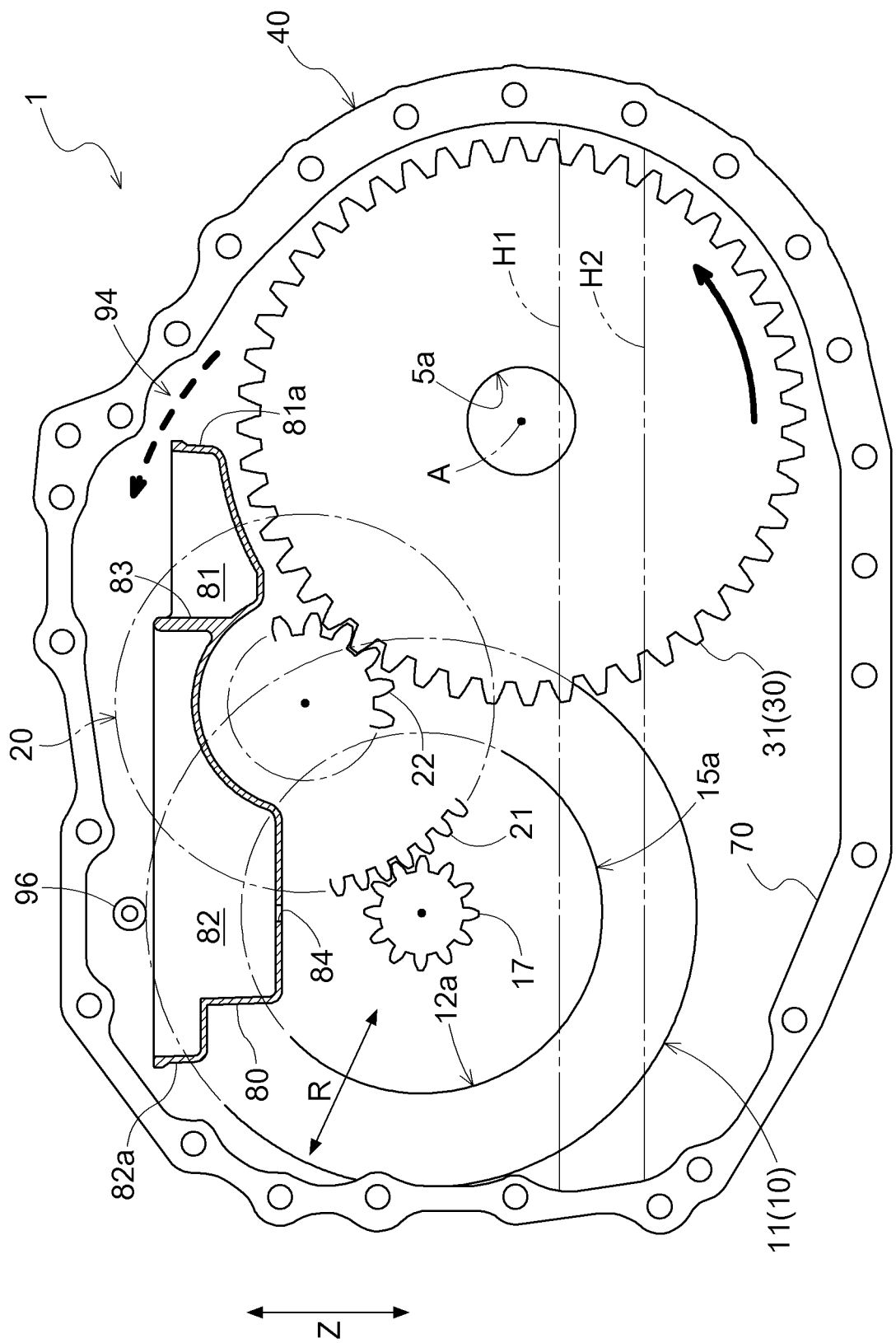
FIG. 5 illustrates a first oil surface and a second oil surface according to the embodiment.

As illustrated in FIG. 6, the vehicle drive device 1 includes hydraulic pumps (51 and 52). As illustrated in FIGS. 5 and 6, the case 40 is provided with a first reservoir portion 70 that stores oil suctioned by the hydraulic pumps (51 and 52) inside the case 40, and a second reservoir portion 80 that stores oil inside the case 40. The "reservoir portion" or "reservoir" is constituted by a member that defines an oil storage space. That is, the "reservoir portion" is a wall portion that defines an oil storage space. The phrase "a case is provided with a reservoir portion" means that the reservoir portion (member that constitutes the reservoir portion) is formed integrally with the case, or that the reservoir portion is fixed to the case. As illustrated in FIG. 5, the second reservoir portion 80 is disposed above the first reservoir portion 70. The second reservoir portion 80 functions as a catch tank that stores oil in order to lower the oil surface in the first reservoir portion 70 or the like. In the present embodiment, the second reservoir portion 80 is constituted by a member that is separate from the case 40, and the second reservoir portion 80 is fixed to the case 40. Specifically, the second reservoir portion 80 is fixed to the inner surface of the case 40 by a fastening bolt or the like.

In the present embodiment, the vehicle drive device 1 includes two hydraulic pumps (51 and 52), namely a first hydraulic pump 51 and a second hydraulic pump 52. The first hydraulic pump 51 is inseparably coupled to the differential gear mechanism 30. The term "separation" as used herein means interruption in power transfer. That is, the first hydraulic pump 51 and the differential gear mechanism 30 are drivably coupled (coupled so as to be able to transfer a drive force) to each other not via an engagement device (such as a friction engagement device or a meshing engagement device) that selectively transfers rotation and a drive force when the first hydraulic pump 51 and the differential gear mechanism 30 are assembled to the vehicle drive device 1. The first hydraulic pump 51 is a pump driven always in conjunction with rotation of the differential gear mechanism 30. In other words, the first hydraulic pump 51 is a pump driven in conjunction with rotation of the plurality of wheels W. That is, the first hydraulic pump 51 is a pump driven by the first rotary electric machine 10. Hence, the amount of oil delivered by the first hydraulic pump 51 becomes larger as the vehicle speed becomes higher. In the present embodiment, as illustrated in FIG. 3, a pump drive shaft 53 coupled to a pump rotor of the first hydraulic pump 51 to drive the first hydraulic pump 51 is coupled to the coupling shaft 23 of the counter gear mechanism 20 so as to rotate therewith. That is, in the present embodiment, the first hydraulic pump 51 (pump drive shaft 53) is inseparably coupled to the differential gear mechanism 30 via the counter gear mechanism 20. In the present embodiment, in addition, the first hydraulic pump 51 is provided on the first wall portion 41. Specifically, a pump chamber that houses the pump rotor is formed between the first wall portion 41 and a pump cover 54 attached to an end surface of the first wall portion 41 on the first axial side L1. In the present embodiment, the first hydraulic pump 51 is configured to be driven in conjunction with rotation of the differential gear mechanism 30 (in conjunction with rotation of the plurality of wheels W) in at least a state in which the plurality of wheels W are rotating in the forward travel direction of the vehicle, among the state in which the plurality of wheels W are rotating in the forward travel direction of the vehicle and a state in which the plurality of wheels W are rotating in the reverse travel direction of the vehicle.

As illustrated in FIG. 6, the second hydraulic pump 52 is a pump driven by the second rotary electric machine 2 which is different from the first rotary electric machine 10. The second rotary electric machine 2 is provided separately from a transfer path for a rotational drive force formed by the power transfer mechanism 3. That is, the second hydraulic pump 52 is a pump driven by a dedicated rotary electric machine, and the amount of oil delivered by the second hydraulic pump 52 is adjustable irrespective of the vehicle speed, unlike the first hydraulic pump 51. An internal gear pump, an external gear pump, a vane pump, or the like may be used as the first hydraulic pump 51 and the second hydraulic pump 52, for example. In FIG. 6, the first hydraulic pump 51 is denoted as MOP (mechanical oil pump), the second hydraulic pump 52 is denoted as EOP (electric oil pump), the second rotary electric machine 2 is denoted as M (motor), the counter gear mechanism 20 is denoted as CG (counter gear), and an oil cooler 7 to be discussed later is denoted as O/C (oil cooler).

As illustrated in FIGS. 5 and 6, the first reservoir portion 70 is formed by the lower portion of the case 40 (bottom portion of the case 40). That is, in the present embodiment, the first reservoir portion 70 is formed integrally with the case 40. The height of the oil surface in the first reservoir portion 70 is varied in accordance with the amount of oil that is present in each oil path of the vehicle drive device 1 and the second reservoir portion 80. The height of the oil surface in the first reservoir portion 70 in a state in which rotation of the plurality of wheels W is stopped is defined as a "first height H1". That is, the first height H1 is the height of the oil surface in the first reservoir portion 70 in a vehicle stationary state in which the vehicle is stationary. In the present embodiment, the first height H1 is the height of the oil surface in the first reservoir portion 70 in a state in which the vehicle is stationary on a flat road.

Meanwhile, the height of the oil surface in the first reservoir portion 70 in a state in which the plurality of wheels W are rotating is defined as a "second height H2". That is, the second height H2 is the height of the oil surface in the first reservoir portion 70 in a vehicle travel state in which the vehicle is traveling. In the present embodiment, the second height H2 is the height of the oil surface in the first reservoir portion 70 in a state in which the plurality of wheels W are rotating in the forward travel direction of the vehicle (in a state in which the vehicle is traveling forward). In the following, unless specifically stated, the term "vehicle travel state" refers to a state in which the vehicle is traveling forward. In the present embodiment, in addition, the second height H2 is the height of the oil surface in the first reservoir portion 70 in a state in which the vehicle is traveling straight at a constant speed on a flat road (i.e. in a state in which no inertial force is acting on the first reservoir portion 70).

In the present embodiment, as discussed above, the first space S1 which houses the differential gear mechanism 30 and the second space S2 which houses the first rotary electric machine 10 are formed inside the case 40 (see FIG. 1). In the present embodiment, the first reservoir portion 70 (specifically, an oil storage space in the first reservoir portion 70) is formed so as to extend between the lower portion of the first space S1 and the lower portion of the second space S2. At least a part (in the present embodiment, the lower part) of the differential gear mechanism 30 is housed in the first reservoir portion 70, and at least a part (in the present embodiment, the lower part) of the first rotary electric machine 10 is housed in the first reservoir portion 70. In the present embodiment, as illustrated in FIG. 6, a communication portion 45 that allows communication between the first space S1 and the second space S2 is formed in the third wall portion 43, which separates the first space S1 and the second space S2 from each other, at a position that is lower than the second height H2. Hence, the oil surface in the second space S2 is raised or lowered in accordance with the height of the oil surface in the first space S1. In a static state in which oil is not moved inside the case 40, the height of the oil surface in the second space S2 coincides with the height of the oil surface in the first space S1.

In the present embodiment, as illustrated in FIGS. 1 and 6, a delivery port 51a of the first hydraulic pump 51 communicates with a supply portion 96 through which oil is supplied to the second reservoir portion 80. Hence, in the vehicle travel state, the first hydraulic pump 51 is driven to suction oil stored in the first reservoir portion 70, and at least a part of the oil suctioned from the first reservoir portion 70 is supplied to the second reservoir portion 80 to be stored in the second reservoir portion 80. Hence, the second height H2 is made lower than the first height H1 by a height corresponding to the amount of oil stored in the second reservoir portion 80 or more. In the present embodiment, as illustrated in FIG. 1, the first wall portion 41 is provided with a reservoir oil path 97 that connects between the delivery port 51a (see FIG. 3) of the first hydraulic pump 51 and the supply portion 96. As illustrated in FIGS. 1 and 5, the supply portion 96 is formed above the second reservoir portion 80. In the present embodiment, the supply portion 96 is formed so as to open in the inner surface of the case 40 (inner surface of the first wall portion 41) above the second reservoir portion 80. The second reservoir portion 80 is formed in the shape of a tank that opens upward, and oil that has flowed out through the supply portion 96 is supplied from the upper opening portion of the second reservoir portion 80 into the second reservoir portion 80.

In the present embodiment, as illustrated in FIGS. 5 and 6, the second height H2 is such a height that the lower part of the differential input gear 31 is immersed in oil stored in the first reservoir portion 70. In addition, as illustrated in FIG. 1, the second reservoir portion 80 and the differential input gear 31 are disposed such that the respective regions of arrangement of the second reservoir portion 80 and the differential input gear 31 overlap each other in the axial direction L (axial direction of the differential input gear 31). As illustrated in FIG. 5, a supply oil path 94 is formed inside the case 40. Through the supply oil path 94, oil splashed from the first reservoir portion 70 by the differential input gear 31 which makes forward rotation (the differential input gear 31 which rotates in a direction indicated by the thick solid arrow in FIG. 5) is supplied to the second reservoir portion 80. The supply oil path 94 is formed in a clearance between the outer peripheral portion of the differential input gear 31 and the inner surface of the case 40. The forward rotation corresponds to a rotational direction that rotates the wheels W in the forward travel direction of the vehicle. Hence, in the vehicle travel state, oil splashed from the first reservoir portion 70 by the differential input gear 31 is moved to a space above the second reservoir portion 80 inside the case 40 through the supply oil path 94, and thereafter supplied from the upper opening of the second reservoir portion 80 into the second reservoir portion 80.

In this manner, in the present embodiment, supply of oil from the first reservoir portion 70 to the second reservoir portion 80 in the vehicle travel state is performed by both drive of the first hydraulic pump 51 and splash by the differential input gear 31. Hence, it is possible to increase the speed at which the oil surface in the first reservoir portion 70 is lowered since the vehicle starts forward travel compared to a case where supply of oil from the first reservoir portion 70 to the second reservoir portion 80 is performed by only either drive of the first hydraulic pump 51 or splash by the differential input gear 31.

In the present embodiment, as illustrated in FIG. 5, the second reservoir portion 80 is partitioned into two chambers (81 and 82) arranged in a horizontal direction (left-right direction in FIG. 5) that is orthogonal to the axial direction L (axial direction of the differential input gear 31). Each of the two chambers (81 and 82) is formed in the shape of a tank that opens upward. The closer of the two chambers (81 and 82) to the supply oil path 94 is defined as a first chamber 81, and the other chamber is defined as a second chamber 82. In the present embodiment, the supply portion 96 through which oil is supplied to the second reservoir portion 80 is provided at a position at which oil can be supplied to the second chamber 82. That is, in the present embodiment, the delivery port 51a of the first hydraulic pump 51 communicates with the supply portion 96 through which oil is supplied to the second chamber 82.

In the present embodiment, the upper end of a peripheral wall portion (first peripheral wall portion 81a) that defines the first chamber 81 is disposed at a position that is lower than the upper end of a peripheral wall portion (second peripheral wall portion 82a) that defines the second chamber 82. Although a partition wall 83 that separates the first chamber 81 and the second chamber 82 from each other is included in each of the first peripheral wall portion 81a and the second peripheral wall portion 82a, the height of the upper end of the first peripheral wall portion 81a is defined as the height of the upper end of a portion of the first peripheral wall portion 81a excluding the partition wall 83. In this manner, by disposing the upper end of the first peripheral wall portion 81a at a position that is lower than the upper end of the second peripheral wall portion 82a, it is possible to improve the efficiency in supplying oil to the first chamber 81 through the supply oil path 94 by securing a large space above the first peripheral wall portion 81a compared to a case where the respective upper ends of the first peripheral wall portion 81a and the second peripheral wall portion 82a are disposed at the same height as each other. In the present embodiment, in addition, the capacity of the first chamber 81 is smaller than the capacity of the second chamber 82. That is, the second chamber 82, to which oil is supplied through the supply portion 96, is formed so as to be larger in capacity than the first chamber 81, which makes it possible to secure an appropriate storable capacity of the second reservoir portion 80.

In the present embodiment, as illustrated in FIG. 5, the second reservoir portion 80 includes a discharge portion 84 through which oil stored in the second reservoir portion 80 is supplied to at least one of the output gear 17 and the first gear 21. In the present embodiment, the discharge portion 84 is formed above the output gear 17 and at a position at which the discharge portion 84 overlaps the output gear 17 as seen in the up-down direction Z. Hence, in the present embodiment, the discharge portion 84 is configured such that oil is directly supplied to the output gear 17. The discharge portion 84 may be configured to be formed at a position at which oil is directly supplied to a meshing portion between the output gear 17 and the first gear 21, or the discharge portion 84 may be configured to be formed at a position at which oil is directly supplied to the first gear 21. In the present embodiment, the discharge portion 84 is formed at the lowermost portion of the second chamber 82. In the present embodiment, in addition, the discharge portion 84 is formed by a through hole that penetrates the bottom portion of the second reservoir portion 80 in the up-down direction Z. In this manner, the second reservoir portion 80 includes the discharge portion 84 which is provided in the bottom portion of the second reservoir portion 80 and through which oil is discharged from the second reservoir portion 80. Although not illustrated, a discharge portion is also formed in the lowermost portion of the first chamber 81 so that oil stored in the second reservoir portion 80 is supplied to a gear (e.g. the differential input gear 31) included in the power transfer mechanism 3. Hence, when the vehicle which is traveling becomes stationary, oil is discharged from the discharge portion 84 in a state in which supply of oil to the second reservoir portion 80 is stopped, and therefore the amount of oil stored in the second reservoir portion 80 is returned to a state before the vehicle starts traveling. Accordingly, the height of the oil surface in the first reservoir portion 70 is raised from the second height H2 to the first height H1.

A value obtained by subtracting the amount of oil stored in the first reservoir portion 70 in the case where the height of the oil surface in the first reservoir portion 70 is the second height H2 from the amount of oil stored in the first reservoir portion 70 in the case where the height of the oil surface in the first reservoir portion 70 is the first height H1 is defined as an "oil amount difference". In order that the second height H2 is a desired height, it is necessary that the amount of oil that is present at locations other than the first reservoir portion 70 should be the oil amount difference. In order that the amount of oil that is present at locations other than the first reservoir portion 70 is the oil amount difference, it is necessary that the total sum of the capacities at locations at which oil can be present other than the first reservoir portion 70 should be equal to or more than the oil amount difference. The locations at which oil can be present other than the first reservoir portion 70 include the second reservoir portion 80 and an oil path through which oil stored in the first reservoir portion 70 is led to an oil supply target through drive of the first hydraulic pump 51. Therefore, the sum of the oil storable capacity of the second reservoir portion 80 and the capacity of the oil path through which oil stored in the first reservoir portion 70 is led to the oil supply target through drive of the first hydraulic pump 51 can be equal to or more than the oil amount difference, for example. The capacity of the oil path here does not include the volume of oil that remains in the oil path in the vehicle stationary state. In the present embodiment, the oil path through which oil stored in the first reservoir portion 70 is led to the oil supply target through drive of the first hydraulic pump 51 includes a first oil path 91 to be discussed later and the reservoir oil path 97 discussed above. The oil path through which oil stored in the first reservoir portion 70 is led to the oil supply target through drive of the first hydraulic pump 51 may further include a suction oil path that connects between the first reservoir portion 70 and a suction port of the first hydraulic pump 51.

In the present embodiment, the second hydraulic pump 52 is provided in addition to the first hydraulic pump 51, and the second hydraulic pump 52 also suctions oil stored in the first reservoir portion 70. Hence, in the case where the oil surface in the first reservoir portion 70 in the vehicle travel state and in a state in which the second hydraulic pump 52 is operating is the second height H2, the sum of the oil storable capacity of the second reservoir portion 80, the capacity of the oil path through which oil stored in the first reservoir portion 70 is led to the oil supply target through drive of the first hydraulic pump 51, and the capacity of the oil path through which oil stored in the first reservoir portion 70 is led to the oil supply target through drive of the second hydraulic pump 52 can be equal to or more than the oil amount difference. The capacity of the oil path here does not include the volume of oil that remains in the oil path in the vehicle stationary state. In the present embodiment, the oil path through which oil stored in the first reservoir portion 70 is led to the oil supply target through drive of the second hydraulic pump 52 includes a second oil path 92 to be discussed later. The oil path through which oil stored in the first reservoir portion 70 is led to the oil supply target through drive of the second hydraulic pump 52 may further include a suction oil path that connects between the first reservoir portion 70 and a suction port of the second hydraulic pump 52.

In the present embodiment, as illustrated in FIGS. 4 and 5, the first height H1 is such a height that at least a part (in the present embodiment, the lower part) of the differential gear mechanism 30 is immersed in oil stored in the first reservoir portion 70. Consequently, at least a part of the differential gear mechanism 30 can be in the state of being immersed in oil when the differential gear mechanism 30 starts rotation along with start of travel of the vehicle. Accordingly, it is possible to suppress the possibility that lubrication of the differential gear mechanism 30 becomes insufficient when the vehicle starts to travel to be low.

Specifically, in the present embodiment, the first height H1 is a height above the lowermost portion of the contact surface 5a of the seal member 5. In the present embodiment, in addition, the first height H1 is a height below the rotational axis A. In the present embodiment, in addition, the first height H1 is such a height that at least a part (in the present embodiment, the lower part) of the washers (34 and 35) is immersed in oil stored in the first reservoir portion 70. Specifically, the first height H1 is such a height that the lower part of the conical washer 34 and the lower part of the side washer 35 are immersed in oil stored in the first reservoir portion 70. In the present embodiment, as illustrated in FIG. 4, the lowermost portion of the contact surface 5a (the contact surface 5a of the seal member 5 on the second axial side L2) which contacts the outer peripheral surface of the output shaft 4 coupled to the first wheel W1 (see FIG. 1) is positioned above the lowermost portion of the contact surface 5a (the contact surface 5a of the seal member 5 on the first axial side L1) which contacts the outer peripheral surface of the output shaft 4 coupled to the second wheel W2 (see FIG. 1). In such a case, the first height H1 is preferably a height above the respective lowermost portions of the seal members 5 on both sides in the axial direction L. In other words, the first height H1 is preferably a height above the lowermost portion of the contact surface 5a which contacts the outer peripheral surface of the output shaft 4 coupled to the first wheel W1 when the first wheel W1 is defined as the wheel W for which one of the pair of seal members 5 whose lowermost portion of the contact surface 5a is the higher is provided.

The first height H1 may be varied in accordance with the operating state of the second hydraulic pump 52. In consideration of this respect, the first height H1 can be the height of the oil surface in the first reservoir portion 70 in the vehicle stationary state and in a state in which the second hydraulic pump 52 is not operating, for example. The first height H1 may alternatively be the height of the oil surface in the first reservoir portion 70 in the vehicle stationary state and in a state in which the second hydraulic pump 52 is operating.

In the present embodiment, as illustrated in FIGS. 5 and 6, the second height H2 is a height below the lowermost portion of the rotor core 15 of the first rotary electric machine 10 (the lowermost portion of the outer peripheral surface 15a). That is, in the present embodiment, the first height H1 is such a height that at least a part (in the present embodiment, the lower part) of the rotor core 15 is immersed in oil stored in the first reservoir portion 70 (see FIG. 5), while the second height H2 is a height below the lowermost portion of the rotor core 15 of the first rotary electric machine 10. Consequently, it is possible to reduce the stirring loss of oil due to rotation of the rotor core 15 by avoiding the rotor core 15 being immersed in oil stored in the first reservoir portion 70 in the vehicle travel state. In addition, it is also possible to reduce the stirring loss of oil due to rotation of the differential gear mechanism 30 (such as the differential input gear 31) during travel of the vehicle in accordance with lowering of the oil surface in the first reservoir portion 70.

In the present embodiment, the second height H2 is a height below the lowermost portion of the inner peripheral surface 12a of the stator core 12. That is, in the present embodiment, the first height H1 is a height above the lowermost portion of the inner peripheral surface 12a of the stator core 12 (see FIG. 5), while the second height H2 is a height below the lowermost portion of the inner peripheral surface 12a of the stator core 12. Consequently, it is possible to suppress the sheering loss of oil due to rotation of the rotor 14 by making the height of the oil surface in the first reservoir portion 70 so low that oil does not enter an air gap in the vehicle travel state. In the present embodiment, as illustrated in FIG. 6, the second height H2 is such a height that a part of the coil end portions 13 is immersed in oil stored in the first reservoir portion 70, and therefore it is also possible to cool the stator 11 using oil stored in the first reservoir portion 70 in the vehicle travel state.

As with the first height H1, the second height H2 may be varied in accordance with the operating state of the second hydraulic pump 52. In addition, the second height H2 may also be varied in accordance with the vehicle speed. The second height H2 can be the height of the oil surface in the first reservoir portion 70 in the vehicle travel state and in a state in which the second hydraulic pump 52 is not operating, for example. The second height H2 may alternatively be the height of the oil surface in the first reservoir portion 70 in the vehicle travel state and in a state in which the second hydraulic pump 52 is operating. The term "vehicle travel state" as used herein refers to a state in which the vehicle speed is equal to or more than a speed threshold determined in advance. The speed threshold can be a speed included in a speed range in which the amount of oil stored in the second reservoir portion 80 is equal to the oil storable capacity of the second reservoir portion 80, that is, a speed range in which oil overflows from the upper opening portion of the second reservoir portion 80, for example. For example, the speed threshold can be a speed included in the range of 15 km/h to 30 km/h.

In the present embodiment, as discussed above, the delivery port 51a of the first hydraulic pump 51 communicates with the supply portion 96 through which oil is supplied to the second reservoir portion 80. In the present embodiment, as illustrated in FIG. 6, the delivery port 51a of the first hydraulic pump 51 further communicates with a cooling oil path 93 that is used to cool the first rotary electric machine 10 not via the second reservoir portion 80. As described below, the delivery port 51a of the first hydraulic pump 51 is connected to the cooling oil path 93 through the first oil path 91. In the present embodiment, in addition, the delivery port 51a of the first hydraulic pump 51 further communicates with bearings B disposed inside the case 40 not via the second reservoir portion 80. As described below, the delivery port 51a of the first hydraulic pump 51 is connected to a supply portion (a second oil passage hole 62, a third oil passage hole 63, and a fourth oil passage hole 64 to be discussed later), through which oil is supplied to the bearings B which are disposed inside the case 40, through the first oil path 91. The bearings B which are disposed inside the case 40 include the first bearing B1, the second bearing B2, the third bearing B3, the fourth bearing B4, the fifth bearing B5, and the sixth bearing B6 discussed above, and the delivery port 51a of the first hydraulic pump 51 communicates with at least one of the six bearings B not via the second reservoir portion 80.

In the present embodiment, as illustrated in FIG. 6, the vehicle drive device 1 includes the first oil path 91 and the second oil path 92. The first oil path 91 is an oil path through which oil delivered by the first hydraulic pump 51 is supplied to the rotor 14 as cooling oil, and through which such oil is supplied to the power transfer mechanism 3 as lubricating oil. The second oil path 92 is an oil path through which oil delivered by the second hydraulic pump 52 is supplied to the stator 11 as cooling oil. With the first oil path 91 and the second oil path 92 provided, it is possible to appropriately cool both the rotor 14 and the stator 11 irrespective of the vehicle speed.

A supplementary description follows. The rotor 14 rotates at a rotational speed that matches the vehicle speed, and therefore the amount of heat generated by the rotor 14 because of the iron loss becomes larger as the frequency of an alternating magnetic field becomes higher (i.e. as the vehicle speed becomes higher). In the present embodiment, permanent magnets are embedded in the rotor core 15, and the permanent magnets tend to generate heat with the hysteresis loss and the eddy current loss, that is, the iron loss, increased as the vehicle speed becomes higher. In this respect, with the first oil path 91 provided in the vehicle drive device 1, oil delivered by the first hydraulic pump 51, which delivers a larger amount of oil as the vehicle speed becomes higher, can be supplied as cooling oil to the rotor 14, which generates a larger amount of heat as the vehicle speed becomes higher. That is, the rotor 14 may not be cooled appropriately in the case where the amount of cooling oil to be supplied to the rotor 14 is excessively small, and the oil drag loss may be too large in the case where the amount of cooling oil to be supplied to the rotor 14 is excessively large. With the configuration in which the rotor 14 is cooled using oil delivered by the first hydraulic pump 51, however, it is possible to appropriately cool the rotor 14 by supplying the rotor 14 with an amount of cooling oil that matches the amount of heat generated by the rotor 14. As illustrated in FIGS. 1 and 3, the first hydraulic pump 51 includes a relieve valve 55, and a part of oil delivered from the first hydraulic pump 51 is discharged from the relieve valve 55 to be returned to the first reservoir portion 70 in the case where the vehicle speed is high and the amount of oil delivered by the first hydraulic pump 51 is excessive or in the case where the hydraulic pressure is higher than usual because of clogging of an oil path or the like. The oil drag loss can be optimized by restricting the amount of oil to be supplied from the first hydraulic pump 51 to the first oil path 91 to be equal to or less than a predetermined value in this manner. Oil delivered by the first hydraulic pump 51 is also supplied to the power transfer mechanism 3 as lubricating oil through the first oil path 91, and therefore various portions of the power transfer mechanism 3 can be lubricated appropriately during travel of the vehicle.

In the present embodiment, in addition, the stator 11 is an armature around which a coil is wound, and therefore the amount of heat generated by the stator 11 does not directly depend on the vehicle speed, and becomes larger as a current that flows through the coil becomes larger. In this respect, with the second oil path 92 provided in the vehicle drive device 1, oil delivered by the second hydraulic pump 52, the amount of oil delivered by which is adjustable irrespective of the vehicle speed, can be supplied to the stator 11 as cooling oil. Hence, it is possible to appropriately cool the stator 11 by supplying the stator 11 with an amount of cooling oil that matches the amount of heat generated by the stator 11. For example, in the case where the first rotary electric machine 10 outputs high torque in a state in which the vehicle speed is low such as when the vehicle is climbing a slope, the amount of heat generated by the stator 11 tends to be large. However, the stator 11 can be cooled appropriately when the stator 11 is supplied with oil from the second hydraulic pump 52, the amount of oil delivered by which is adjustable irrespective of the vehicle speed, rather than from the first hydraulic pump 51, the amount of oil delivered by which matches the vehicle speed. In such a state in which the vehicle speed is low, the amount of heat generated by the rotor 14 is small, and the oil drag loss may be excessively large if a large amount of cooling oil is supplied to the rotor 14. In the vehicle drive device 1 according to the present embodiment, however, it is possible to avoid such a problem since cooling oil is supplied to the rotor 14 from the first hydraulic pump 51. It is not necessary for the second hydraulic pump 52 to deliver oil for cooling the rotor 14, and therefore the second hydraulic pump 52 can be advantageously reduced in size by suppressing the maximum oil delivery amount required for the second hydraulic pump 52 to be accordingly small. In the present embodiment, as illustrated in FIG. 6, the second oil path 92 is provided with the oil cooler 7 (heat exchanger) which cools oil, and the oil cooled by the oil cooler 7 is supplied to the stator 11.

In the present embodiment, as illustrated in FIG. 2, the cooling oil path 93 is configured to cool the rotor core 15 from the inner side in the radial direction R. That is, in the present embodiment, the first oil path 91 communicates with the cooling oil path 93 which cools the rotor core 15 from the inner side in the radial direction R. Specifically, the rotor shaft 16 is formed in a tubular shape that extends in the axial direction L, and the cooling oil path 93 is formed inside the rotor shaft 16. The cooling oil path 93 is formed so as to extend in the axial direction L. The rotor core 15 is fixed to the outer peripheral surface of the rotor shaft 16, and therefore the rotor core 15 is cooled from the inner side in the radial direction R through heat exchange between oil that flows through the cooling oil path 93 and the rotor shaft 16.

In order to intensively cool the middle portion of the rotor core 15 which tends to trap heat, it is desirable to supply oil at a relatively low temperature to a position in the cooling oil path 93 at which heat can be exchanged with the middle portion of the rotor core 15 in the axial direction L. In the present embodiment, in view of this respect, it is possible to supply oil at a relatively low temperature to a position in the cooling oil path 93 at which heat can be exchanged with the middle portion of the rotor core 15 in the axial direction L using an oil path formation member 60 disposed on the inner side in the radial direction R with respect to the rotor shaft 16. Specifically, as illustrated in FIGS. 1 to 3, the oil path formation member 60 is formed in a tubular shape that is smaller in diameter than the rotor shaft 16 and that extends in the axial direction L. In the present embodiment, the oil path formation member 60 is disposed coaxially with the rotor shaft 16. The cooling oil path 93 is formed between the outer peripheral surface of the oil path formation member 60 and the inner peripheral surface of the rotor shaft 16. In addition, an internal oil path 91b is formed in a space surrounded by the inner peripheral surface of the oil path formation member 60. The internal oil path 91b is formed so as to extend in the axial direction L. The internal oil path 91b is an oil path that is included in the first oil path 91 and that connects between the upstream portion of the first oil path 91 and the cooling oil path 93. In the present embodiment, the intermediate shaft 8, which is formed in a tubular shape that extends in the axial direction L, is disposed on the first axial side L1 with respect to the rotor shaft 16 coaxially with the rotor shaft 16 so as to be rotatable together with the rotor shaft 16. The oil path formation member 60 is formed so as to be smaller in diameter than the intermediate shaft 8, and a portion of the oil path formation member 60 on the first axial side L1 is disposed on the inner side in the radial direction R with respect to the intermediate shaft 8.

In the present embodiment, an end portion of the oil path formation member 60 on the first axial side L1 is held by the first wall portion 41, and an end portion of the oil path formation member 60 on the second axial side L2 is held by the second wall portion 42. In the present embodiment, as illustrated in FIG. 3, a connection portion 91c of the first oil path 91 between a delivery oil path 91a, which extends from the first hydraulic pump 51, and the internal oil path 91b is formed in the first wall portion 41. That is, in the present embodiment, the connection portion 91c is formed in the first wall portion 41 or the second wall portion 42, and specifically in the first wall portion 41. When one of the first wall portion 41 and the second wall portion 42 in which the connection portion 91c is formed is defined as a "target wall portion", the first wall portion 41 serves as the target wall portion in the present embodiment. The delivery oil path 91a is an oil path, an end portion of which on the upstream side is connected to the delivery port 51a of the first hydraulic pump 51. Oil delivered from the first hydraulic pump 51 flows through the delivery oil path 91a and the connection portion 91c, and thereafter flows into the internal oil path 91b. The oil which has flowed into the internal oil path 91b flows through the internal oil path 91b toward the second axial side L2.

As illustrated in FIG. 2, the oil path formation member 60 includes first oil passage holes 61 that allow communication between the internal oil path 91b and the cooling oil path 93. The first oil passage holes 61 are formed so as to penetrate the oil path formation member 60 from the inner side to the outer side in the radial direction R. In the present embodiment, the first oil passage holes 61 are formed so as to penetrate the oil path formation member 60 in parallel with the radial direction R. A part of oil that flows through the internal oil path 91b flows through the first oil passage holes 61 toward the outer side in the radial direction R to flow into the cooling oil path 93. In the present embodiment, a plurality of first oil passage holes 61 are formed at the same position in the axial direction L at different positions in the circumferential direction (circumferential direction of the first rotary electric machine 10).

Oil that has flowed from the internal oil path 91b into the cooling oil path 93 flows through the cooling oil path 93 in the axial direction L in the state of tightly contacting the inner peripheral surface of the rotor shaft 16 because of a centrifugal force due to rotation of the rotor shaft 16. In the present embodiment, the opening portions of the first oil passage holes 61 on the outer side in the radial direction R are disposed in the region of arrangement of the rotor core 15 in the axial direction L. Specifically, the opening portions of the first oil passage holes 61 on the outer side in the radial direction R are disposed at the middle portion of the rotor core 15 in the axial direction L. Hence, oil that is at about the same temperature as that of oil in the internal oil path 91*b* can be supplied to a position in the cooling oil path 93 at which heat can be exchanged with the middle portion of the rotor core 15 in the axial direction L. Accordingly, it is possible to intensively cool the middle portion of the rotor core 15 in the axial direction L which tends to trap heat.

In the present embodiment, as illustrated in FIG. 2, discharge oil paths 16*a* through which oil in the cooling oil path 93 is discharged to a space on the outer side of the rotor shaft 16 are formed on both sides in the axial direction L with respect to the first oil passage holes 61. The discharge oil paths 16*a* are formed so as to penetrate the rotor shaft 16 from the inner side to the outer side in the radial direction R. Hence, as indicated by the broken allows in FIG. 2, oil that has flowed from the internal oil path 91*b* into the cooling oil path 93 flows from the middle portion of the rotor core 15 in the axial direction L toward both sides in the axial direction L, and thereafter is discharged to a space on the outer side in the radial direction R with respect to the rotor shaft 16 through the discharge oil paths 16*a*. In the present embodiment, the oil discharged to a space on the outer side in the radial direction R through the discharge oil paths 16*a* is supplied to the coil end portions 13 by a centrifugal force. That is, it is possible to cool the coil end portions 13 on both sides in the axial direction L using oil after cooling the rotor core 15.

In the present embodiment, as described above, the delivery port 51*a* of the first hydraulic pump 51 communicates with the cooling oil path 93 by way of the delivery oil path 91*a*, the connection portion 91*c*, and the internal oil path 91*b*, that is, by way of the first oil path 91. As illustrated in FIGS. 2 and 3, the oil path formation member 60 is provided with a plurality of oil passage holes (the second oil passage hole 62, the third oil passage hole 63, and the fourth oil passage hole 64) that penetrate the oil path formation member 60 from the inner side to the outer side in the radial direction R, besides the first oil passage holes 61. Hence, a part of oil in the internal oil path 91*b* is supplied to the third bearing B3 as lubricating oil through the second oil passage hole 62. In addition, a part of oil in the internal oil path 91*b* is supplied to the first bearing B1 and the fourth bearing B4 as lubricating oil through the third oil passage hole 63. The intermediate shaft 8 is provided with a communication oil path 8*a* that penetrates the intermediate shaft 8 from the inner side to the outer side in the radial direction R, and oil that has flowed to the outer side in the radial direction R through the third oil passage hole 63 is supplied to the first bearing B1 and the fourth bearing B4 through a spline engagement portion between the rotor shaft 16 and the intermediate shaft 8 and the communication oil path 8*a*. In addition, a part of oil in the internal oil path 91*b* is supplied to the second bearing B2 as lubricating oil through the fourth oil passage hole 64. In this manner, the delivery port 51*a* of the first hydraulic pump 51 communicates with the bearings B, which are disposed inside the case 40, by way of the delivery oil path 91*a*, the connection portion 91*c*, and the internal oil path 91*b*, that is, by way of the first oil path 91.

In this manner, the first oil path 91 is an oil path through which oil delivered by the first hydraulic pump 51 is supplied to the rotor 14 as cooling oil, and through which such oil is supplied to the power transfer mechanism 3 (here, the bearings B of the power transfer mechanism 3) as lubricating oil.

In the present embodiment, the first oil path 91 is configured such that oil delivered by the first hydraulic pump 51 is also supplied to the counter gear mechanism 20 as lubricating oil. That is, the power transfer mechanism 3, to which lubricating oil is supplied through the first oil path 91, includes the counter gear mechanism 20 in addition to the bearings B. Specifically, as illustrated in FIG. 3, the first oil path 91 includes an oil path (in the present embodiment, an in-shaft oil path 91*d* formed inside the pump drive shaft 53) that connects between the delivery port 51*a* of the first hydraulic pump 51 and a hollow portion in the coupling shaft 23 of the counter gear mechanism 20. Oil that has flowed into the hollow portion in the coupling shaft 23 through the in-shaft oil path 91*d* is supplied as lubricating oil to the first gear 21, the second gear 22, the fifth bearing B5, or the sixth bearing B6, for example.

In the present embodiment, as illustrated in FIG. 3, the connection portion 91*c* of the first oil path 91 is formed inside the first wall portion 41 (target wall portion). Specifically, the first wall portion 41 includes a first insertion hole 44 into which an end portion of the oil path formation member 60 on the first axial side L1 is inserted. The connection portion 91*c* is provided so as to open in the inner peripheral surface of the first insertion hole 44 on the first axial side L1 (back side of the first insertion hole 44) with respect to the oil path formation member 60. Hence, oil supplied to the connection portion 91*c* through the delivery oil path 91*a* flows into the first insertion hole 44, and thereafter flows into the in-shaft oil path 91*d* from an opening portion at an end portion of the oil path formation member 60 on the first axial side L1. In this manner, in the present embodiment, an end portion of the oil path formation member 60 on the first axial side L1 is held by the first wall portion 41 in the state of being inserted into the first insertion hole 44, which is formed in the first wall portion 41, from the second axial side L2. Similarly, in the present embodiment, as illustrated in FIG. 2, an end portion of the oil path formation member 60 on the second axial side L2 is held by the second wall portion 42 in the state of being inserted into a second insertion hole 47, which is formed in the second wall portion 42, from the first axial side L1. In the example illustrated in FIG. 2, the second insertion hole 47 is formed in a member fixed with respect to the second wall portion 42 by a fastening member.

In the present embodiment, as illustrated in FIG. 3, in order to secure an appropriate amount of oil that flows from the delivery oil path 91*a* to the internal oil path 91*b*, a stepped portion 6 is provided to restrict movement of the oil path formation member 60 toward the first axial side L1 (back side of the first insertion hole 44) with respect to the first wall portion 41 (target wall portion). The stepped portion 6 is formed on at least one of the outer peripheral surface of the oil path formation member 60 and the inner peripheral surface of the first insertion hole 44. In the present embodiment, the stepped portion 6 is formed on the outer peripheral surface of the oil path formation member 60. Specifically, the stepped portion 6 is a projecting portion formed on the outer peripheral surface of the oil path formation member 60 to project toward the outer side in the radial direction R compared to a portion on the first axial side L1. Movement of the oil path formation member 60 toward the first axial side L1 is restricted with a surface of the stepped portion 6 that faces the first axial side L1 (in the present embodiment, a surface, the normal to which is inclined with respect to the axial direction L) abutting against a surface of the first wall portion 41 that faces the second axial side L2. That is, by providing such a stepped portion 6, movement of the oil path formation member 60 toward the first axial side L1 can be restricted even in the case where an external force directed toward the first wall portion 41 is applied to the oil path formation member 60. As a result, it is possible to avoid a portion of the connection portion 91c that opens in the inner peripheral surface of the first insertion hole 44 being clogged by an end portion of the oil path formation member 60 on the first axial side L1.

In the present embodiment, as illustrated in FIGS. 2 and 6, oil delivered by the second hydraulic pump 52 is supplied to the stator 11 from above to cool the stator 11. Specifically, an oil supply portion 65 through which oil supplied through the second oil path 92 is supplied to the stator 11 is provided between the second wall portion 42 and the third wall portion 43 in the axial direction L. The oil supply portion 65 is disposed above the stator 11. A connection oil path 95 that connects between the second oil path 92 and the oil supply portion 65 is formed in the second wall portion 42. Hence, oil delivered from the second hydraulic pump 52 flows through the second oil path 92 and the connection oil path 95, and thereafter flows into the oil supply portion 65. The stator 11 is cooled by oil supplied from the oil supply portion 65 to the stator 11.

In the present embodiment, the oil supply portion 65 is formed in a tubular shape that extends in the axial direction L, and an oil path that extends in the axial direction L is formed inside the oil supply portion 65. The oil supply portion 65 includes oil supply holes (66a and 66b) formed so as to penetrate the oil supply portion 65 from the inner side to the outer side in the radial direction R. The oil supply holes (66a and 66b) are provided at positions overlapping the stator 11 as seen in the up-down direction Z. Oil supplied to the oil supply portion 65 drops down from the oil supply holes (66a and 66b) to the stator 11 because of the effect of the gravitational force to cool the stator 11. In the present embodiment, the oil supply portion 65 includes first oil supply holes 66a, which are disposed at positions overlapping the coil end portions 13 as seen in the up-down direction Z, in correspondence with the coil end portions 13 on both sides in the axial direction L, and a second oil supply hole 66b, which is disposed at a position overlapping the stator core 12 as seen in the up-down direction Z, at the middle portion of the stator core 12 in the axial direction L.

Other Embodiments

Next, vehicle drive devices according to other embodiments will be described.

(1) In the embodiment described above, the second reservoir portion 80 is configured to be partitioned into two chambers (81 and 82). However, the present disclosure is not limited to such a configuration. The second reservoir portion 80 may be configured to have only one chamber, or the second reservoir portion 80 may be configured to be partitioned into three or more chambers.

(2) In the embodiment described above, the delivery port 51a of the first hydraulic pump 51 is configured to communicate with the supply portion 96 through which oil is supplied to the second reservoir portion 80. However, the present disclosure is not limited to such a configuration. The delivery port 51a of the first hydraulic pump 51 may be configured not to communicate with the supply portion 96.

(3) In the embodiment described above, the delivery port 51a of the first hydraulic pump 51 is configured to communicate with both the bearings B, which are disposed inside the case 40, and the cooling oil path 93, which is used to cool the first rotary electric machine 10, not via the second reservoir portion 80. However, the present disclosure is not limited to such a configuration. The delivery port 51a of the first hydraulic pump 51 may be configured to communicate with only either the bearings B or the cooling oil path 93 not via the second reservoir portion 80, or the delivery port 51a of the first hydraulic pump 51 may be configured to communicate with any of the bearings B and the cooling oil path 93 only via the second reservoir portion 80.

(4) In the embodiment described above, a delivery port 52a of the second hydraulic pump 52 is configured not to communicate with the supply portion 96. However, the present disclosure is not limited to such a configuration. The delivery port 52a of the second hydraulic pump 52 may be configured to communicate with the supply portion 96.

(5) In the embodiment described above, the oil path formation member 60 is configured to be held by the case 40. That is, the oil path formation member 60 is a non-rotary member. However, the present disclosure is not limited to such a configuration. A tubular member that rotates in conjunction with a rotary member of the power transfer mechanism 3 may be used as the oil path formation member 60. For example, the pump drive shaft 53 of the first hydraulic pump 51 may be configured to be disposed coaxially with the first rotary electric machine 10, and the oil path formation member 60 may be configured to be coupled to the pump drive shaft 53, or a part of the pump drive shaft 53 may be configured to function as the oil path formation member 60.

(6) In the embodiment described above, the oil path formation member 60 is disposed on the inner side in the radial direction R with respect to the rotor shaft 16, and oil is supplied from the internal oil path 91b, which is formed inside the oil path formation member 60, to the cooling oil path 93, that is, oil is supplied to the cooling oil path 93 from the inner side in the radial direction R. However, the present disclosure is not limited to such a configuration. A supply portion through which oil is supplied to the cooling oil path 93 may be disposed on the first axial side L1 or the second axial side L2 with respect to the cooling oil path 93, so that oil may be supplied to the cooling oil path 93 from the outer side in the axial direction L.

(7) In the embodiment described above, the cooling oil path 93 is configured to be formed inside the rotor shaft 16. However, the present disclosure is not limited to such a configuration. The cooling oil path 93 may be configured to include an axial oil path that penetrates a portion of the rotor core 15 between the inner peripheral surface and the outer peripheral surface 15a in the axial direction L, or the cooling oil path 93 may be configured to include both such an axial oil path and an oil path formed inside the rotor shaft 16.

(8) In the embodiment described above, the stepped portion 6, which restricts movement of the oil path formation member 60 toward the first axial side L1 with respect to the first wall portion 41, is configured to be formed in only the outer peripheral surface of the oil path formation member 60, among the outer peripheral surface of the oil path formation member 60 and the inner peripheral surface of the first insertion hole 44. However, the present disclosure is not limited to such a configuration. The stepped portion 6 may be configured to be formed in only the inner peripheral surface of the first insertion hole 44, or may be configured to be formed in both the outer peripheral surface of the oil path formation member 60 and the inner peripheral surface of the first insertion hole 44. In the case where the stepped portion 6 is formed on the inner peripheral surface of the first insertion hole 44, the stepped portion 6 may be a projecting portion formed on the inner peripheral surface of the first insertion hole 44 to project on the inner side in the radial direction R compared to a portion on the second axial side L2.

(9) In the embodiment described above, the connection portion 91c of the first oil path 91 is formed in the first wall portion 41, and the connection oil path 95 which connects between the second oil path 92 and the oil supply portion 65 is formed in the second wall portion 42. However, the present disclosure is not limited to such a configuration. The connection portion 91c may be configured to be formed in a portion of the case 40 other than the first wall portion 41, or the connection oil path 95 may be configured to be formed in a portion (e.g. the third wall portion 43) of the case 40 other than the second wall portion 42. For example, the connection portion 91c may be configured to be formed in the second wall portion 42 (i.e. the second wall portion 42 is the target wall portion). In this case, the connection portion 91c is preferably provided so as to open in the inner peripheral surface of the second insertion hole 47 on the second axial side L2 (back side of the second insertion hole 47) with respect to the oil path formation member 60. In addition, in this case, the stepped portion 6 is preferably provided so as to restrict movement of the oil path formation member 60 toward the second axial side L2 (back side of the second insertion hole 47) with respect to the second wall portion 42. In a configuration in which the connection portion 91c is formed in the second wall portion 42 in this manner, the first hydraulic pump 51 may be provided in the second wall portion 42, unlike the embodiment described above.

(10) In the embodiment described above, the rotational axis A of the differential gear mechanism 30 is disposed at a height between the uppermost portion and the lowermost portion of the rotor core 15 of the first rotary electric machine 10. However, the present disclosure is not limited to such a configuration. The rotational axis A of the differential gear mechanism 30 may be disposed above the uppermost portion of the rotor core 15, or the rotational axis A of the differential gear mechanism 30 may be disposed below the lowermost portion of the rotor core 15.

(11) In the embodiment described above, the power transfer mechanism 3 is configured to include the counter gear mechanism 20. However, the present disclosure is not limited to such a configuration. The power transfer mechanism 3 may be configured not to include the counter gear mechanism 20. For example, the output gear 17 may be configured to be meshed with the differential input gear 31. In a configuration in which the power transfer mechanism 3 includes the counter gear mechanism 20 or a configuration in which the power transfer mechanism 3 does not include the counter gear mechanism 20, the power transfer mechanism 3 may be configured such that a different mechanism or device such as a planetary gear mechanism is provided in a power transfer path between the output gear 17 and the differential input gear 31.

(12) In the embodiment described above, the vehicle drive device 1 is configured to include two hydraulic pumps, namely the first hydraulic pump 51 and the second hydraulic pump 52. However, the present disclosure is not limited to such a configuration. The vehicle drive device 11 may be configured to include only one of the first hydraulic pump 51 and the second hydraulic pump 52. That is, the vehicle drive device 1 may be configured to include only the first hydraulic pump 51, or the vehicle drive device 1 may be configured to include only the second hydraulic pump 52. In the latter case, as described above in (4), the delivery port 52a of the second hydraulic pump 52 is preferably configured to communicate with the supply portion 96. Alternatively, the delivery port 52a of the second hydraulic pump 52 may be configured to communicate with the first oil path 91.

(13) A configuration disclosed in the embodiment discussed above can also be applied in combination with a configuration disclosed in any other embodiment (including a combination of the other embodiments described above) unless any contradiction occurs. Regarding the other configurations as well, the embodiment disclosed herein is merely illustrative in all respects. Thus, a variety of alterations can be made, as appropriate, without departing from the scope and spirit of the present disclosure.

Overview of Above Embodiment

An overview of the vehicle drive device described above will be described below.

A vehicle drive device (1) includes a rotary electric machine (10), a power transfer mechanism (3) that transfers a rotational drive force between the rotary electric machine (10) and a plurality of wheels (W), a case (40) that houses at least a part of the power transfer mechanism (3) and the rotary electric machine (10), and a hydraulic pump (51). The power transfer mechanism (3) includes a differential gear mechanism (30) that distributes torque input from a rotary electric machine (10) side to the plurality of wheels (W). In the vehicle drive device (1), the case (40) is provided with a first reservoir portion (70) that stores oil suctioned by the hydraulic pump (51) inside the case (40), and a second reservoir portion (80) that stores oil inside the case (40); the hydraulic pump (51) is a pump driven always in conjunction with rotation of the differential gear mechanism (30); a delivery port (51a) of the hydraulic pump (51) communicates with a supply portion (96) through which oil is supplied to the second reservoir portion (80); at least a part of the differential gear mechanism (30) is housed in the first reservoir portion (70); and a first height (H1) is a height of an oil surface in the first reservoir portion (70) in a state in which rotation of the plurality of wheels (W) is stopped, and the first height (H1) is such a height that at least a part of the differential gear mechanism (30) is immersed in oil stored in the first reservoir portion (70).

According to this configuration, a first height (H1) is the height of the oil surface in the first reservoir portion (70) in a state (vehicle stationary state) in which the vehicle is stationary, and the first height (H1) is such a height that at least a part of the differential gear mechanism (30) is immersed in oil stored in the first reservoir portion (70). Hence, at least a part of the differential gear mechanism (30) is in the state of being immersed in oil when the differential gear mechanism (30) starts rotation along with start of travel of the vehicle. Accordingly, it is possible to suppress the possibility that lubrication of the differential gear mechanism (30) becomes insufficient when the vehicle starts to travel to be low.

According to the configuration described above, further, the vehicle drive device includes the hydraulic pump (51) which suctions oil stored in the first reservoir portion (70), and the hydraulic pump (51) is driven always in conjunction with rotation of the differential gear mechanism (30). The delivery port (51a) of the hydraulic pump (51) communicates with the supply portion (96), through which oil is supplied to the second reservoir portion (80) which is provided separately from the first reservoir portion (70). Hence, in a state (vehicle travel state) in which the vehicle is traveling, the hydraulic pump (51) is driven to suction oil stored in the first reservoir portion (70), and the oil surface in the first reservoir portion (70) can be made lower than the first height (H1) by a height corresponding to the amount of oil stored in the second reservoir portion (80) or more because the oil which has been suctioned from the first reservoir portion (70) is supplied to the second reservoir portion (80). That is, the oil surface in the first reservoir portion (70) can be lowered positively in the vehicle travel state, and thus it is possible to suppress the stirring loss of oil due to rotation of a rotary member such as the differential gear mechanism (30) during travel of the vehicle to be low.

As described above, according to the configuration described above, it is possible to reduce the stirring loss of oil in a vehicle travel state while suppressing the possibility that lubrication of the differential gear mechanism (30) becomes insufficient when the vehicle starts to travel to be low.

A second height (H2) is a height of an oil surface in the first reservoir portion (70) in a state in which the plurality of wheels (W) are rotating, and the second height (H2) is preferably a height below a lowermost portion of a rotor core (15) of the rotary electric machine (10).

According to this configuration, the stirring loss of oil due to rotation of the rotor core (15) can be reduced by avoiding the rotor core (15) being immersed in oil stored in the first reservoir portion (70) in the vehicle travel state. Hence, the stirring loss of oil in the vehicle travel state can be further reduced.

A vehicle drive device (1) includes a rotary electric machine (10), a power transfer mechanism (3) that transfers a rotational drive force between the rotary electric machine (10) and a plurality of wheels (W), a case (40) that houses at least a part of the power transfer mechanism (3) and the rotary electric machine (10), and a hydraulic pump (51, 52). The power transfer mechanism (3) includes a differential gear mechanism (30) that distributes torque input from a rotary electric machine (10) side to the plurality of wheels (W) In the vehicle drive device (1), the case (40) is provided with a first reservoir portion (70) that stores oil suctioned by the hydraulic pump (51, 52) inside the case (40), and a second reservoir portion (80) that stores oil inside the case (40); at least a part of the differential gear mechanism (30) is disposed at a height between an uppermost portion and a lowermost portion of a rotor (14) of the rotary electric machine (10); a delivery port (51a, 52a) of the hydraulic pump (51, 52) communicates with a supply portion (96) through which oil is supplied to the second reservoir portion (80); at least a part of the rotary electric machine (10) is housed in the first reservoir portion (70); a first height (H1) is a height of an oil surface in the first reservoir portion (70) in a state in which rotation of the plurality of wheels (W) is stopped, and the first height (H1) is such a height that at least a part of a rotor core (15) of the rotor (14) is immersed in oil stored in the first reservoir portion (70); and a second height (H2) is a height of an oil surface in the first reservoir portion (70) in a state in which the plurality of wheels (W) are rotating and the second height (H2) is a height below a lowermost portion of the rotor core (15).

According to this configuration, the second height (H2) is a height below the lowermost portion of the rotor core (15). Hence, the stirring loss of oil due to rotation of the rotor core (15) can be reduced by avoiding the rotor core (15) being immersed in oil stored in the first reservoir portion (70) in the vehicle travel state. In the vehicle travel state, in addition, the height of the oil surface in the first reservoir portion (70) can be lowered from the first height (H1) to the second height (H2), and therefore the stirring loss of oil due to rotation of another rotary member that rotates during travel of the vehicle, as with the differential gear mechanism (30), can also be reduced. The delivery port (51a, 52a) of the hydraulic pump (51, 52) which suctions oil stored in the first reservoir portion (70) communicates with the supply portion (96) through which oil is supplied to the second reservoir portion (80) which is provided separately from the first reservoir portion (70), and therefore the oil surface in the first reservoir portion (70) can be lowered positively only if the hydraulic pump (51, 52) is operating in the vehicle travel state.

According to the configuration described above, further, the first height (H1) is such a height that at least a part of the rotor core (15) is immersed in oil stored in the first reservoir portion (70). That is, as described above, the height (first height (H1)) of the oil surface in the first reservoir portion (70) in the vehicle stationary state can be made so high that at least a part of the rotor core (15) is immersed in oil while the height (second height (H2)) of the oil surface in the first reservoir portion (70) in the vehicle travel state is lowered in order to reduce the stirring loss of oil. As a result of being able to make the first height (H1) so high, it is easy to immerse at least a part of the differential gear mechanism (30), at least a part of which is disposed at a height between the uppermost portion and the lowermost portion of the rotor (14), in oil stored in the first reservoir portion (70). Consequently, it is possible to suppress the possibility that lubrication of the differential gear mechanism (30) becomes insufficient when the vehicle starts to travel to be low.

As described above, according to the configuration described above, it is possible to reduce the stirring loss of oil in a vehicle travel state while suppressing the possibility that lubrication of the differential gear mechanism (30) becomes insufficient when the vehicle starts to travel to be low.

In the configuration in which the second height (H2) is a height below the lowermost portion of the rotor core (15) as described above, a sum of an oil storable capacity of the second reservoir portion (80) and a capacity of an oil path through which oil stored in the first reservoir portion (70) is led to an oil supply target through drive of the hydraulic pump (51, 52) is preferably equal to or more than a value obtained by subtracting an amount of oil stored in the first reservoir portion (70) in a case where the height of the oil surface in the first reservoir portion (70) is the second height (H2) from an amount of oil stored in the first reservoir portion (70) in a case where the height of the oil surface in the first reservoir portion (70) is the first height (H1).

According to this configuration, in which the hydraulic pump (51, 52) is actuated in the vehicle travel state and oil in the first reservoir portion (70) is supplied to the second reservoir portion (80) through drive of the hydraulic pump (51, 52), splash by a gear, or the like in the vehicle travel state, it is possible to lower the oil surface in the first reservoir portion (70) in the vehicle travel state from the first height (H1) to the second height (H2). With the configuration in which the amount of oil stored in the second reservoir portion (80) is returned to the state before start of travel of the vehicle after travel of the vehicle is stopped, in addition, it is possible to raise the oil surface in the first reservoir portion (70) in the vehicle stationary state from the second height (H2) to the first height (H1). Hence, according to the configuration described above, it is possible to appropriately vary the height of the oil surface in the first reservoir portion (70) between the first height (H1) and the second height (H2) in accordance with whether the vehicle is in the vehicle stationary state or the vehicle travel state.

Preferably, the second reservoir portion (80) is disposed above the first reservoir portion (70); and the second reservoir portion (80) includes a discharge portion (84) which is provided in a bottom portion of the second reservoir portion (80) and through which oil is discharged from the second reservoir portion (80).

According to this configuration, it is possible to discharge oil supplied from the first reservoir portion (70) and stored in the second reservoir portion (80) through the discharge portion (84) using the gravitational force, and to return such oil to the first reservoir portion (70) which is disposed below the second reservoir portion (80). Hence, a structure that allows oil stored in the second reservoir portion (80) in the vehicle travel state to be returned to the first reservoir portion (70) after the vehicle becomes stationary can be achieved with a relatively simple configuration that uses the gravitational force.

Preferably, the plurality of wheels (W) include a first wheel (W1); the power transfer mechanism (3) includes an output shaft (4) that couples the differential gear mechanism (30) and the first wheel (W1) to each other; the output shaft (4) is supported so as to be rotatable with respect to the case (40) in a state of being inserted into a communication hole (46) that communicates between an inside and an outside of the case (40); a seal member (5) is disposed on an inner peripheral surface of the communication hole (46) and the seal member (5) has a contact surface (5a) that contacts an outer peripheral surface of the output shaft (4), or an outer peripheral surface of a member that rotates together with the output shaft (4), in a slidable state; and the first height (H1) is a height above a lowermost portion of the contact surface (5a).

According to this configuration, at least the lowermost portion of the contact surface (5a) of the seal member (5) can be immersed in oil in the vehicle stationary state. Hence, start of rotation of the output shaft (4) in a state in which lubrication of the contact surface (5a) is insufficient when the vehicle starts to travel can be suppressed. Accordingly, wear of or damage to the seal member (5) can be suppressed.

Preferably, the plurality of wheels (W) include a first wheel (W1); the power transfer mechanism (3) includes an output shaft (4) that couples the differential gear mechanism (30) and the first wheel (W1) to each other; the differential gear mechanism (30) includes a differential input gear (31) meshed with a gear (22) that is used to input torque of the rotary electric machine (10) to the differential gear mechanism (30), a differential output gear (32) that rotates together with the output shaft (4), a differential case (33) that houses the differential output gear (32) and that rotates together with the differential input gear (31), and a washer (34, 35) disposed between the differential case (33) and the differential output gear (32) in an axial direction (L) of the output shaft (4); and the first height (H1) is such a height that at least a part of the washer (34, 35) is immersed in oil stored in the first reservoir portion (70).

According to this configuration, absence of an oil film on the washer (34, 35) can be suppressed in the vehicle stationary state. Hence, start of rotation of the differential output gear (32) in a state in which lubrication of the washer (34, 35) is insufficient when the vehicle starts to travel can be suppressed. Accordingly, wear of or damage to the washer (34, 35) can be suppressed to improve the durability of the differential gear mechanism (30).

Preferably, the differential gear mechanism (30) includes a differential input gear (31) meshed with a gear (22) that is used to input torque of the rotary electric machine (10) to the differential gear mechanism (30); the second reservoir portion (80) and the differential input gear (31) are disposed such that respective regions of arrangement of the second reservoir portion (80) and the differential input gear (31) overlap each other in an axial direction (L) of the differential input gear (31); a second height (H2) is a height of an oil surface in the first reservoir portion (70) in a state in which the plurality of wheels (W) are rotating, and the second height (H2) is such a height that a lower part of the differential input gear (31) is immersed in oil stored in the first reservoir portion (70); a supply oil path (94) through which oil splashed from the first reservoir portion (70) by the differential input gear (31) which rotates forward is supplied to the second reservoir portion (80) is formed inside the case (40); the second reservoir portion (80) is partitioned into two chambers (81, 82) arranged in a horizontal direction that is orthogonal to the axial direction (L) of the differential input gear (31); each of the two chambers (81, 82) is formed in a shape of a tank that opens upward; the closer of the two chambers (81, 82) to the supply oil path (94) is a first chamber (81), the other chamber is a second chamber (82), and an upper end of a peripheral wall portion (81a) that defines the first chamber (81) is disposed at a position below an upper end of a peripheral wall portion (82a) that defines the second chamber (82); a capacity of the first chamber (81) is smaller than a capacity of the second chamber (82); and a delivery port (51a, 52a) of the hydraulic pump (51, 52) communicates with a supply portion (96) through which oil is supplied to the second reservoir portion (82).

According to this configuration, supply of oil from the first reservoir portion (70) to the second reservoir portion (80) in a state in which the vehicle is traveling forward can be performed by both drive of the hydraulic pump (51, 52) and splash by the differential input gear (31). Hence, the time since the vehicle starts forward travel until the height of the oil surface in the first reservoir portion (70) is brought to the second height (H2) can be shortened, which makes it possible to suppress the stirring loss of oil to be low at a relatively early stage after the vehicle starts forward travel.

According to the configuration described above, in addition, the second reservoir portion (80) is partitioned into two chambers (81, 82) in the shape of a tank that opens upward, namely a first chamber (81) that is closer to the supply oil path (94) through which oil splashed by the differential input gear (31) is supplied to the second reservoir portion (80), and a second chamber (82) supplied with oil through the supply portion (96) which communicates with the delivery port (51a) of the hydraulic pump (51). Since the upper end of the peripheral wall portion (81a) of the first chamber (81) is disposed at a position that is lower than the upper end of the peripheral wall portion (82a) of the second chamber (82), it is possible to improve the efficiency in supplying oil to the first chamber (81) through the supply oil path (94) by securing a large space above the peripheral wall portion (81a) of the first chamber (81) compared to a case where the respective upper ends of the peripheral wall portion (81a) of the first chamber (81) and the peripheral wall portion (82a) of the second chamber (82) are disposed at the same height as each other. In addition, the second chamber (82) is formed to be larger in capacity than the first chamber (81), and therefore an appropriate oil storable capacity of the second reservoir portion (80) can be secured. As described above, according to the configuration described above, an appropriate oil storable capacity of the second reservoir portion (80) can be secured while improving the efficiency in supplying oil splashed from the first reservoir portion (70) by the differential input gear (31) to the second reservoir portion (80).

Preferably, the power transfer mechanism (3) includes a counter gear mechanism (20) that transfers a rotational drive force between the rotary electric machine (10) and the differential gear mechanism (30); the counter gear mechanism (20) includes a first gear (21) meshed with an output gear (17) of the rotary electric machine (10), a second gear (22) meshed with a differential input gear (31) of the differential gear mechanism (30), and a coupling shaft (23) that couples the first gear (21) and the second gear (22) to each other; and the second reservoir portion (80) includes a discharge portion (84) through which oil stored in the second reservoir portion (80) is supplied to at least one of the output gear (17) and the first gear (21).

According to this configuration, oil can be appropriately supplied to the meshing portion between the output gear (17) and the first gear (21), which requires lubrication, by making effective use of the second reservoir portion (80) which is used to lower the oil surface in the first reservoir portion (70).

A delivery port (51a, 52a) of the hydraulic pump (51, 52) preferably communicates with at least one of a bearing (B) disposed inside the case (40) and a cooling oil path (93) that is used to cool the rotary electric machine (10) not via the second reservoir portion (80).

According to this configuration, it is possible to immediately supply oil delivered by the hydraulic pump (51, 52) to at least one of the bearing (B) which requires lubrication and the rotary electric machine (10) which requires cooling when drive of the hydraulic pump (51, 52) is started.

Preferably, the case (40) includes a separation wall (43) that separates a first space (S1) that houses the differential gear mechanism (30) and a second space (S2) that houses the rotary electric machine (10) from each other; and a second height (H2) is a height of an oil surface in the first reservoir portion (70) in a state in which the plurality of wheels (W) are rotating, and a communication portion (45) that allows communication between the first space (S1) and the second space (S2) is formed in the separation wall (43) at a position below the second height (H2).

According to this configuration, the oil surface in the second space (S2) is raised or lowered in accordance with variations in the height of the oil surface in the first space (S1). Therefore, at least a part of the rotary electric machine (10) which is housed in the second space (S2) is immersed in oil in the vehicle stationary state in the case where the first height (H1) is such a height that at least a part of the differential gear mechanism (30) which is housed in the first space (S1) is immersed in oil, depending on the position of arrangement of the rotary electric machine (10) in the up-down direction (Z). Even in such a case, the oil surface in the first reservoir portion (70) can be lowered in the vehicle travel state as discussed above, and therefore the stirring loss of oil or the sheering loss of oil due to rotation of the rotary electric machine (10) can be reduced in the vehicle travel state.

Preferably, the rotary electric machine (10) includes a rotor core (15) and a stator core (12) disposed on an outer side in a radial direction (R) with respect to the rotor core (15); the stator core (12) has a cylindrical inner peripheral surface (12a) that faces an outer peripheral surface (15a) of the rotor core (15) in the radial direction (R); and the first height (H1) is a height above a lowermost portion of the inner peripheral surface (12a) of the stator core (12).

According to this configuration, in the rotary electric machine (10) of an inner rotor type, the height (first height (H1)) of the oil surface in the first reservoir portion (70) in the vehicle stationary state can be made so high that oil enters an air gap formed between the rotor core (15) and the stator core (12). Hence, it is easy to make the first height (H1) so high that at least a part of the differential gear mechanism (30) is immersed in oil stored in the first reservoir portion (70), in order to suppress the possibility that lubrication of the differential gear mechanism (30) becomes insufficient when the vehicle starts to travel to be low.

In the configuration in which the first height (H1) is a height above a lowermost portion of the inner peripheral surface (12a) of the stator core (12) as described above, a second height is a height of an oil surface in the first reservoir portion (70) in a state in which the plurality of wheels (W) are rotating, and the second height (H2) is preferably a height below the lowermost portion of the inner peripheral surface (12a) of the stator core (12).

According to this configuration, the sheering loss of oil due to rotation of the rotor (14) can be suppressed by making the height (second height (H2)) of the oil surface in the first reservoir portion (70) in the vehicle travel state so low that oil does not enter an air gap while making the first height (H1) so high that oil enters an air gap as described above.

At least a part of the differential gear mechanism (30) is preferably disposed at a height between an uppermost portion and a lowermost portion of a rotor (14) of the rotary electric machine (10).

According to this configuration, at least a part of the rotor (14) is immersed in oil in the vehicle stationary state in the case where the first height (H1) is such a height that at least a part of the differential gear mechanism (30) is immersed in oil, depending on the position of arrangement of the rotor (14) in the up-down direction (Z). Even in such a case, the oil surface in the first reservoir portion (70) can be lowered in the vehicle travel state as discussed above, and therefore the stirring loss of oil or the sheering loss of oil due to rotation of the rotor (14) can be reduced in the vehicle travel state.

It is only necessary that the vehicle drive device according to the present disclosure should achieve at least one of the effects discussed above.

The invention claimed is:
1. A vehicle drive device comprising
a rotary electric machine,
a power transfer mechanism that transfers a rotational drive force between the rotary electric machine and a plurality of wheels,
a case that houses at least a part of the power transfer mechanism and the rotary electric machine, and
a hydraulic pump, wherein:
the power transfer mechanism includes a differential gear mechanism that distributes torque input from a rotary electric machine side to the plurality of wheels,
the case is provided with a first reservoir that stores oil suctioned by the hydraulic pump inside the case, and a second reservoir that stores oil inside the case;
the hydraulic pump is a pump driven always in conjunction with rotation of the differential gear mechanism;

a delivery port of the hydraulic pump communicates with a supply through which oil is supplied to the second reservoir;
at least a part of the differential gear mechanism is housed in the first reservoir;
a first height is a height of an oil surface in the first reservoir in a state in which rotation of the plurality of wheels is stopped, and the first height is such a height that at least a part of the differential gear mechanism is immersed in oil stored in the first reservoir;
the differential gear mechanism includes a differential input gear meshed with a gear that is used to input torque of the rotary electric machine to the differential gear mechanism; and
a supply oil path through which oil splashed from the first reservoir by the differential input gear which rotates forward is supplied to the second reservoir is formed inside the case.

2. The vehicle drive device according to claim 1, wherein a second height is a height of the oil surface in the first reservoir in a state in which the plurality of wheels are rotating, and the second height is a height below a lowermost part of a rotor core of the rotary electric machine.

3. The vehicle drive device according to claim 2, wherein a sum of an oil storable capacity of the second reservoir and a capacity of an oil path through which oil stored in the first reservoir is led to an oil supply target through drive of the hydraulic pump is equal to or more than a value obtained by subtracting an amount of oil stored in the first reservoir in a case where the height of the oil surface in the first reservoir is the second height from an amount of oil stored in the first reservoir in a case where the height of the oil surface in the first reservoir is the first height.

4. The vehicle drive device according to claim 1, wherein:
the second reservoir is disposed above the first reservoir; and
the second reservoir includes a discharge which is provided in a bottom of the second reservoir and through which oil is discharged from the second reservoir.

5. The vehicle drive device according to claim 1, wherein:
the plurality of wheels include a first wheel;
the power transfer mechanism includes an output shaft that couples the differential gear mechanism and the first wheel to each other;
the output shaft is supported so as to be rotatable with respect to the case in a state of being inserted into a communication hole that communicates between an inside and an outside of the case;
a seal is disposed on an inner peripheral surface of the communication hole, the seal having a contact surface that contacts an outer peripheral surface of the output shaft, or an outer peripheral surface of a member that rotates together with the output shaft, in a slidable state; and
the first height is a height above a lowermost part of the contact surface.

6. The vehicle drive device according to claim 1, wherein:
the plurality of wheels include a first wheel;
the power transfer mechanism includes an output shaft that couples the differential gear mechanism and the first wheel to each other;
the differential gear mechanism includes a differential output gear that rotates together with the output shaft, a differential case that houses the differential output gear and that rotates together with the differential input gear, and a washer disposed between the differential case and the differential output gear in an axial direction of the output shaft; and
the first height is such a height that at least a part of the washer is immersed in oil stored in the first reservoir.

7. The vehicle drive device according to claim 1, wherein:
the second reservoir and the differential input gear are disposed such that respective regions of arrangement of the second reservoir and the differential input gear overlap each other in an axial direction of the differential input gear;
a second height is a height of the oil surface in the first reservoir in a state in which the plurality of wheels are rotating, and the second height is such a height that a lower part of the differential input gear is immersed in oil stored in the first reservoir;
the second reservoir is partitioned into two chambers arranged in a horizontal direction that is orthogonal to the axial direction of the differential input gear;
each of the two chambers is formed in a shape of a tank that opens upward;
the closer of the two chambers to the supply oil path is a first chamber, the other chamber is a second chamber, and an upper end of a peripheral wall that defines the first chamber is disposed at a position below an upper end of a peripheral wall that defines the second chamber;
a capacity of the first chamber is smaller than a capacity of the second chamber; and
a delivery port of the hydraulic pump communicates with a supply through which oil is supplied to the second chamber.

8. The vehicle drive device according to claim 1, wherein:
the power transfer mechanism includes a counter gear mechanism that transfers a rotational drive force between the rotary electric machine and the differential gear mechanism;
the counter gear mechanism includes a first gear meshed with an output gear of the rotary electric machine, the gear meshed with the differential input gear of the differential gear mechanism, and a coupling shaft that couples the first gear and the second gear to each other; and
the second reservoir includes a discharge through which oil stored in the second reservoir is supplied to at least one of the output gear and the first gear.

9. The vehicle drive device according to claim 1, wherein a delivery port of the hydraulic pump communicates with at least one of a bearing disposed inside the case and a cooling oil path that is used to cool the rotary electric machine not via the second reservoir.

10. The vehicle drive device according to claim 1, wherein:
the case includes a separation wall that separates a first space that houses the differential gear mechanism and a second space that houses the rotary electric machine from each other; and
a second height is a height of the oil surface in the first reservoir in a state in which the plurality of wheels are rotating, and a communication that allows communication between the first space and the second space is formed in the separation wall at a position below the second height.

11. The vehicle drive device according to claim 1, wherein:
the rotary electric machine includes a rotor core and a stator core disposed on an outer side in a radial direction with respect to the rotor core;
the stator core has a cylindrical inner peripheral surface that faces an outer peripheral surface of the rotor core in the radial direction; and
the first height is a height above a lowermost part of the inner peripheral surface of the stator core.

12. The vehicle drive device according to claim 11, wherein
a second height is a height of the oil surface in the first reservoir in a state in which the plurality of wheels are rotating, and the second height is a height below the lowermost part of the inner peripheral surface of the stator core.

13. The vehicle drive device according to claim 1, wherein
at least a part of the differential gear mechanism is disposed at a height between an uppermost part and a lowermost part of a rotor of the rotary electric machine.

14. A vehicle drive device comprising:
a rotary electric machine,
a power transfer mechanism that transfers a rotational drive force between the rotary electric machine and a plurality of wheels,
a case that houses at least a part of the power transfer mechanism and the rotary electric machine, and
a hydraulic pump, wherein:
the power transfer mechanism includes a differential gear mechanism that distributes torque input from a rotary electric machine side to the plurality of wheels:
the case is provided with a first reservoir that stores oil suctioned by the hydraulic pump inside the case, and a second reservoir that stores oil inside the case;
at least a part of the differential gear mechanism is disposed at a height between an uppermost part and a lowermost part of a rotor of the rotary electric machine;
a delivery port of the hydraulic pump communicates with a supply through which oil is supplied to the second reservoir;
at least a part of the rotary electric machine is housed in the first reservoir;
a first height is a height of an oil surface in the first reservoir in a state in which rotation of the plurality of wheels is stopped, and the first height is such a height that at least a part of a rotor core of the rotor is immersed in oil stored in the first reservoir;
a second height is a height of the oil surface in the first reservoir in a state in which the plurality of wheels are rotating, and the second height is a height below a lowermost part of the rotor core;
the differential gear mechanism includes a differential input gear meshed with a gear that is used to input torque of the rotary electric machine to the differential gear mechanism; and
a supply oil path through which oil splashed from the first reservoir by the differential input gear which rotates forward is supplied to the second reservoir is formed inside the case.

15. The vehicle drive device according to claim 14, wherein
a sum of an oil storable capacity of the second reservoir and a capacity of an oil path through which oil stored in the first reservoir is led to an oil supply target through drive of the hydraulic pump is equal to or more than a value obtained by subtracting an amount of oil stored in the first reservoir in a case where the height of the oil surface in the first reservoir is the second height from an amount of oil stored in the first reservoir in a case where the height of the oil surface in the first reservoir is the first height.

16. The vehicle drive device according to claim 14, wherein:
the second reservoir is disposed above the first reservoir; and
the second reservoir includes a discharge which is provided in a bottom of the second reservoir and through which oil is discharged from the second reservoir.

17. The vehicle drive device according to claim 14, wherein:
the plurality of wheels include a first wheel;
the power transfer mechanism includes an output shaft that couples the differential gear mechanism and the first wheel to each other;
the output shaft is supported so as to be rotatable with respect to the case in a state of being inserted into a communication hole that communicates between an inside and an outside of the case;
a seal is disposed on an inner peripheral surface of the communication hole, the seal having a contact surface that contacts an outer peripheral surface of the output shaft, or an outer peripheral surface of a member that rotates together with the output shaft, in a slidable state; and
the first height is a height above a lowermost part of the contact surface.

18. The vehicle drive device according to claim 14, wherein:
the plurality of wheels include a first wheel;
the power transfer mechanism includes an output shaft that couples the differential gear mechanism and the first wheel to each other;
the differential gear mechanism includes a differential output gear that rotates together with the output shaft, a differential case that houses the differential output gear and that rotates together with the differential input gear, and a washer disposed between the differential case and the differential output gear in an axial direction of the output shaft; and
the first height is such a height that at least a part of the washer is immersed in oil stored in the first reservoir.

19. The vehicle drive device according to claim 14, wherein:
the second reservoir and the differential input gear are disposed such that respective regions of arrangement of the second reservoir and the differential input gear overlap each other in an axial direction of the differential input gear;
a second height is a height of the oil surface in the first reservoir in a state in which the plurality of wheels are rotating, and the second height is such a height that a lower part of the differential input gear is immersed in oil stored in the first reservoir;
the second reservoir is partitioned into two chambers arranged in a horizontal direction that is orthogonal to the axial direction of the differential input gear;
each of the two chambers is formed in a shape of a tank that opens upward;
the closer of the two chambers to the supply oil path is a first chamber, the other chamber is a second chamber, and an upper end of a peripheral wall that defines the first chamber is disposed at a position below an upper end of a peripheral wall that defines the second chamber;

a capacity of the first chamber is smaller than a capacity of the second chamber; and a delivery port of the hydraulic pump communicates with a supply through which oil is supplied to the second chamber.

20. The vehicle drive device according to claim 14, wherein:

the power transfer mechanism includes a counter gear mechanism that transfers a rotational drive force between the rotary electric machine and the differential gear mechanism;

the counter gear mechanism includes a first gear meshed with an output gear of the rotary electric machine, the gear meshed with the differential input gear of the differential gear mechanism, and a coupling shaft that couples the first gear and the second gear to each other; and the second reservoir includes a discharge through which oil stored in the second reservoir is supplied to at least one of the output gear and the first gear.

21. A vehicle drive device comprising a rotary electric machine, a power transfer mechanism that transfers a rotational drive force between the rotary electric machine and a plurality of wheels, a case that houses at least a part of the power transfer mechanism and the rotary electric machine, and a hydraulic pump, wherein:

the power transfer mechanism includes a differential gear mechanism that distributes torque input from a rotary electric machine side to the plurality of wheels, the case is provided with a first reservoir that stores oil suctioned by the hydraulic pump inside the case, and a second reservoir that stores oil inside the case;

the hydraulic pump is a pump driven always in conjunction with rotation of the differential gear mechanism;

a delivery port of the hydraulic pump communicates with a supply through which oil is supplied to the second reservoir;

at least a part of the differential gear mechanism is housed in the first reservoir;

a first height is a height of an oil surface in the first reservoir in a state in which rotation of the plurality of wheels is stopped, and the first height is such a height that at least a part of the differential gear mechanism is immersed in oil stored in the first reservoir;

the power transfer mechanism includes a counter gear mechanism that transfers a rotational drive force between the rotary electric machine and the differential gear mechanism;

the counter gear mechanism includes a first gear meshed with an output gear of the rotary electric machine, a second gear meshed with a differential input gear of the differential gear mechanism, and a coupling shaft that couples the first gear and the second gear to each other; and the second reservoir includes a discharge through which oil stored in the second reservoir is supplied to at least one of the output gear and the first gear.

22. A vehicle drive device comprising:

a rotary electric machine, a power transfer mechanism that transfers a rotational drive force between the rotary electric machine and a plurality of wheels, a case that houses at least a part of the power transfer mechanism and the rotary electric machine, and a hydraulic pump, wherein:

the power transfer mechanism includes a differential gear mechanism that distributes torque input from a rotary electric machine side to the plurality of wheels:

the case is provided with a first reservoir that stores oil suctioned by the hydraulic pump inside the case, and a second reservoir that stores oil inside the case;

at least a part of the differential gear mechanism is disposed at a height between an uppermost part and a lowermost part of a rotor of the rotary electric machine;

a delivery port of the hydraulic pump communicates with a supply through which oil is supplied to the second reservoir;

at least a part of the rotary electric machine is housed in the first reservoir;

a first height is a height of an oil surface in the first reservoir in a state in which rotation of the plurality of wheels is stopped, and the first height is such a height that at least a part of a rotor core of the rotor is immersed in oil stored in the first reservoir;

a second height is a height of the oil surface in the first reservoir in a state in which the plurality of wheels are rotating, and the second height is a height below a lowermost part of the rotor core;

the power transfer mechanism includes a counter gear mechanism that transfers a rotational drive force between the rotary electric machine and the differential gear mechanism;

the counter gear mechanism includes a first gear meshed with an output gear of the rotary electric machine, a second gear meshed with a differential input gear of the differential gear mechanism, and a coupling shaft that couples the first gear and the second gear to each other; and the second reservoir includes a discharge through which oil stored in the second reservoir is supplied to at least one of the output gear and the first gear.

* * * * *